A. ALTMAN.
NEEDLE STRAIGHTENING MACHINE.
APPLICATION FILED AUG. 31, 1917.
1,361,514.
Patented Dec. 7, 1920.
12 SHEETS—SHEET 1.
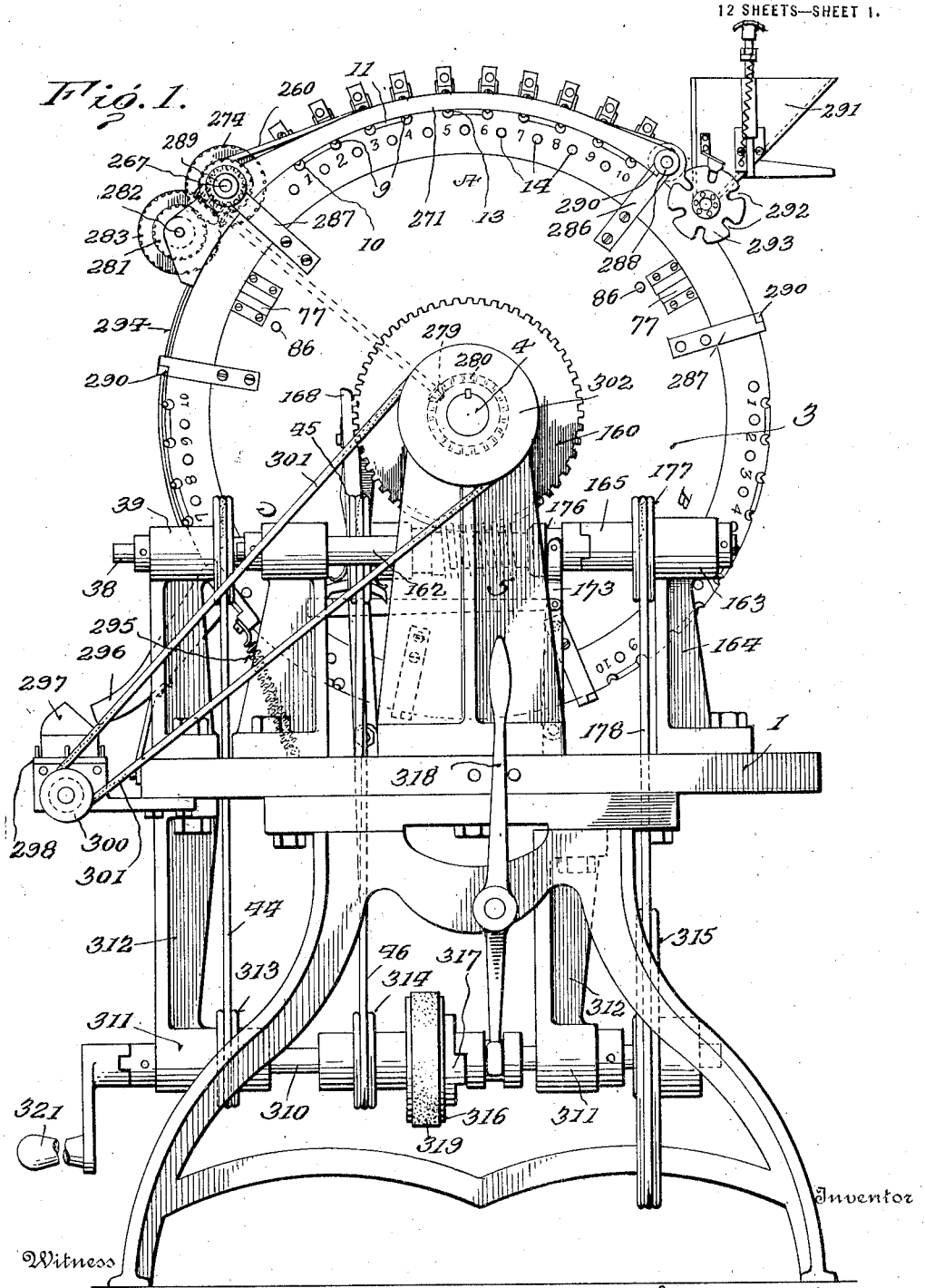

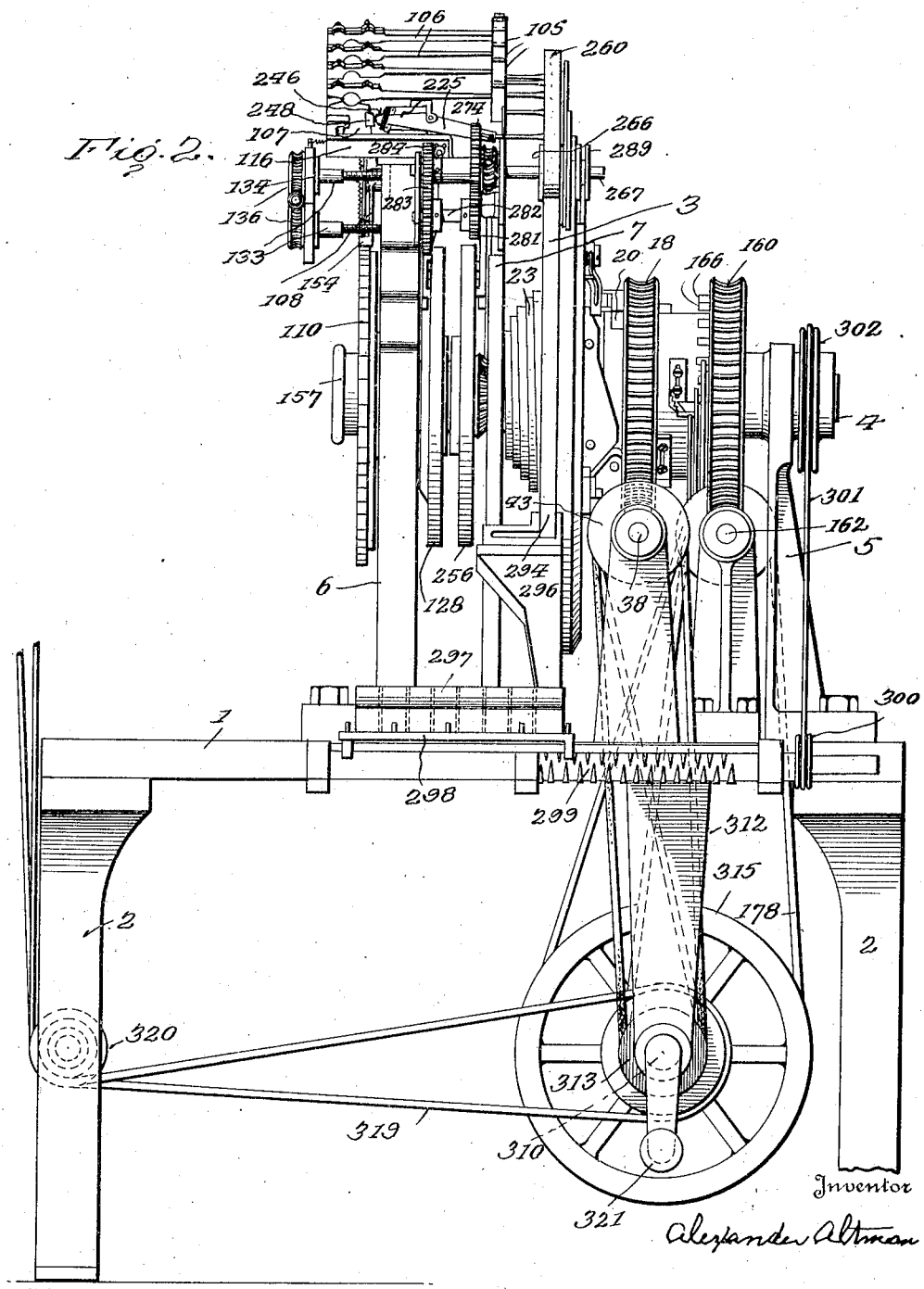

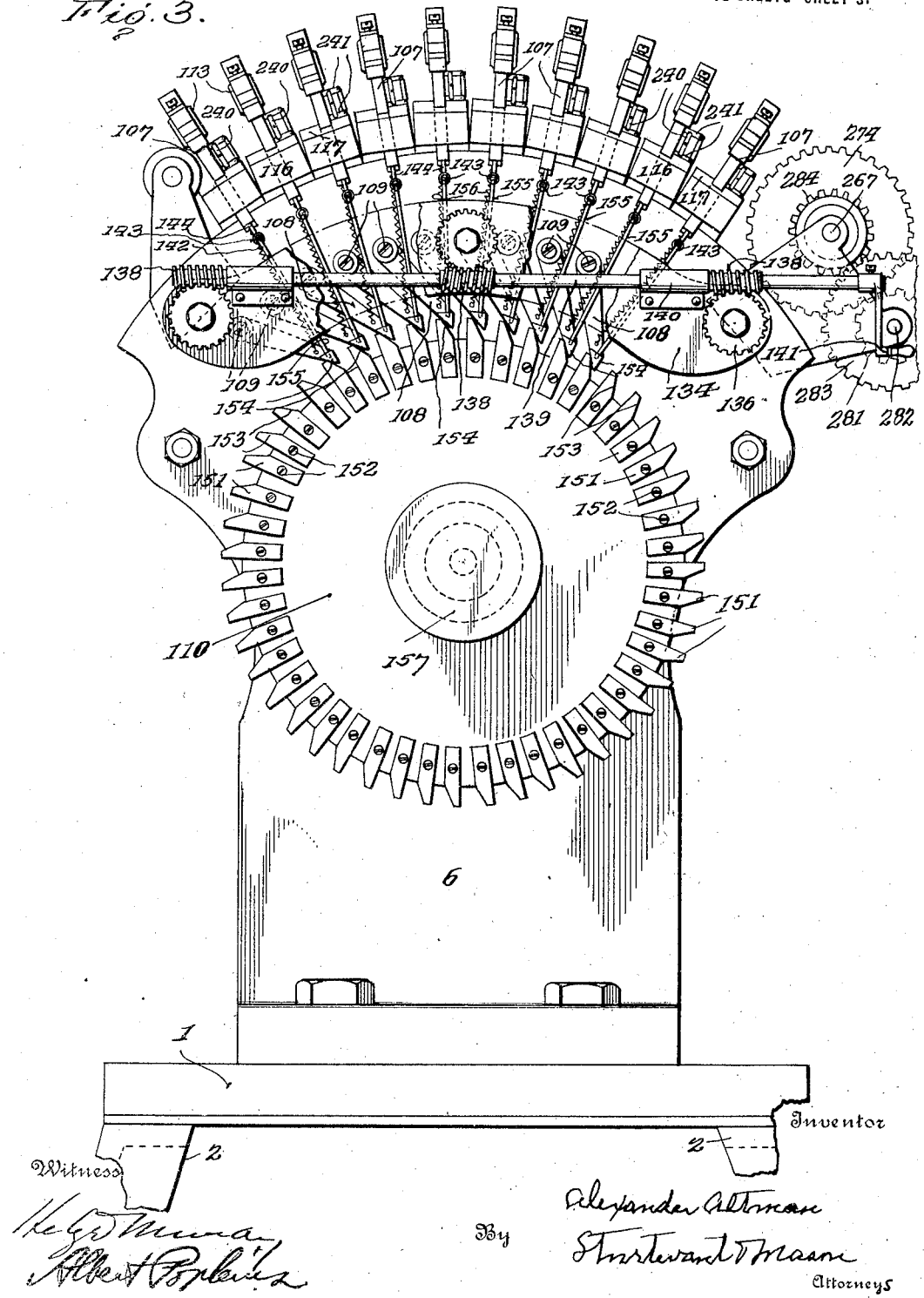

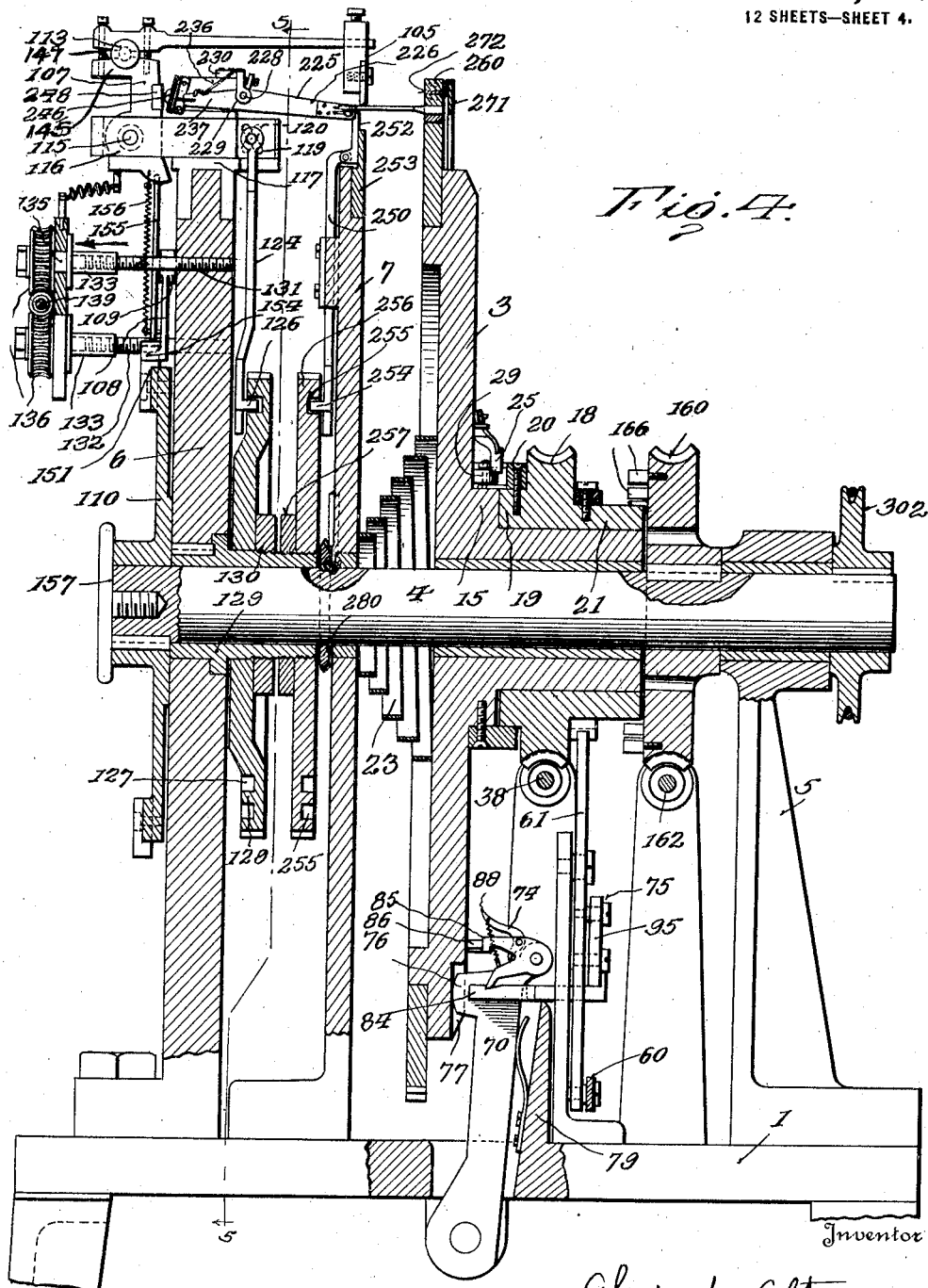

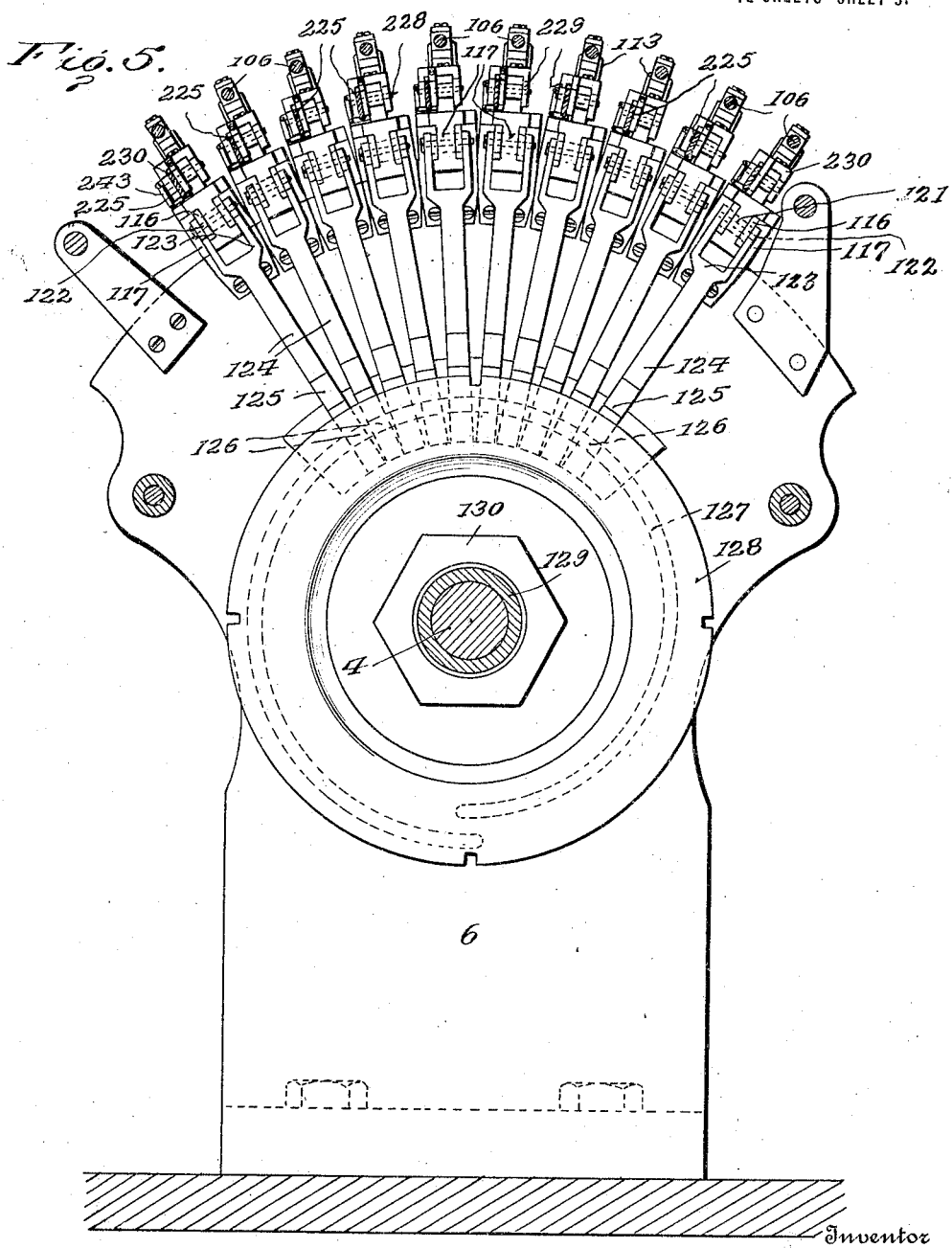

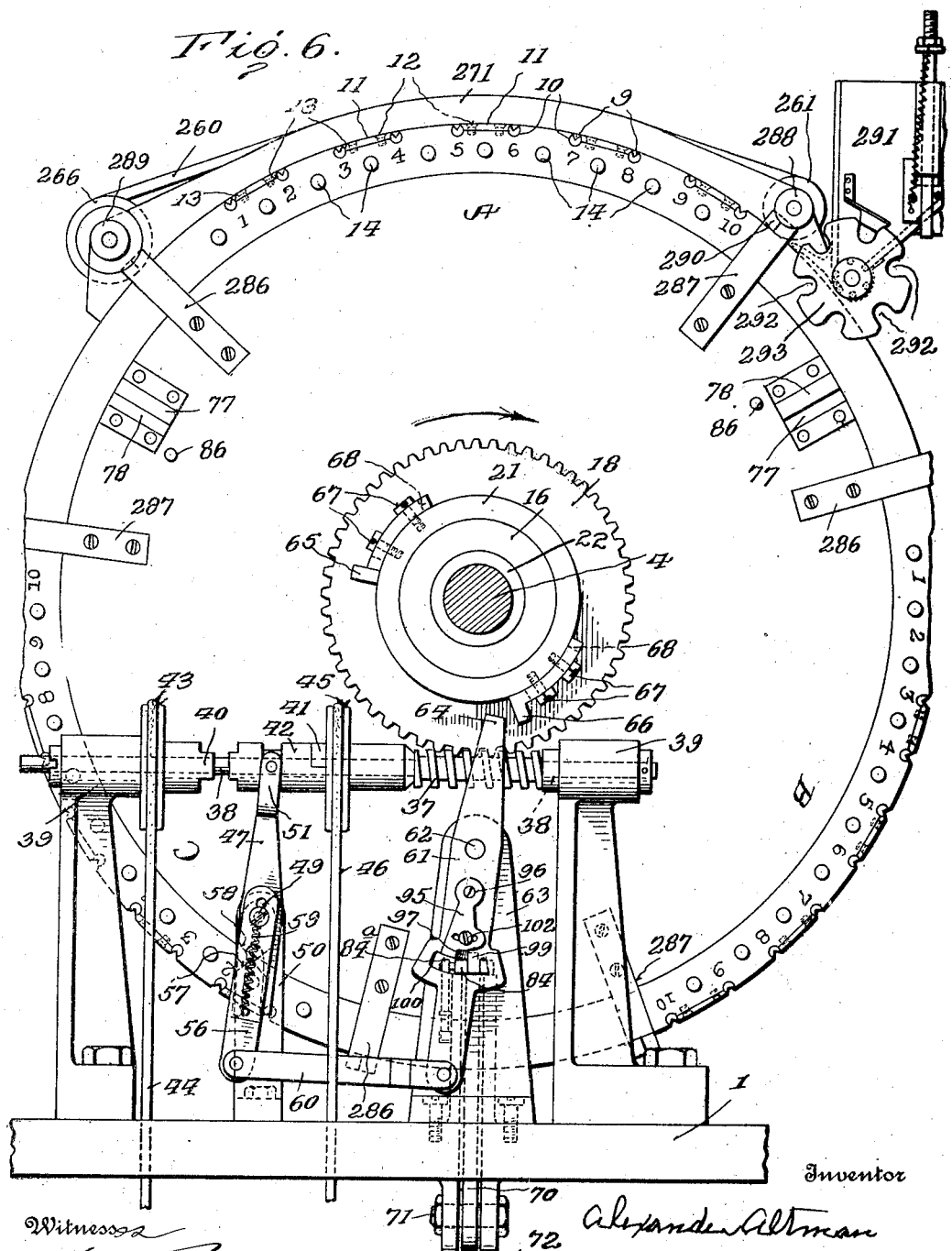

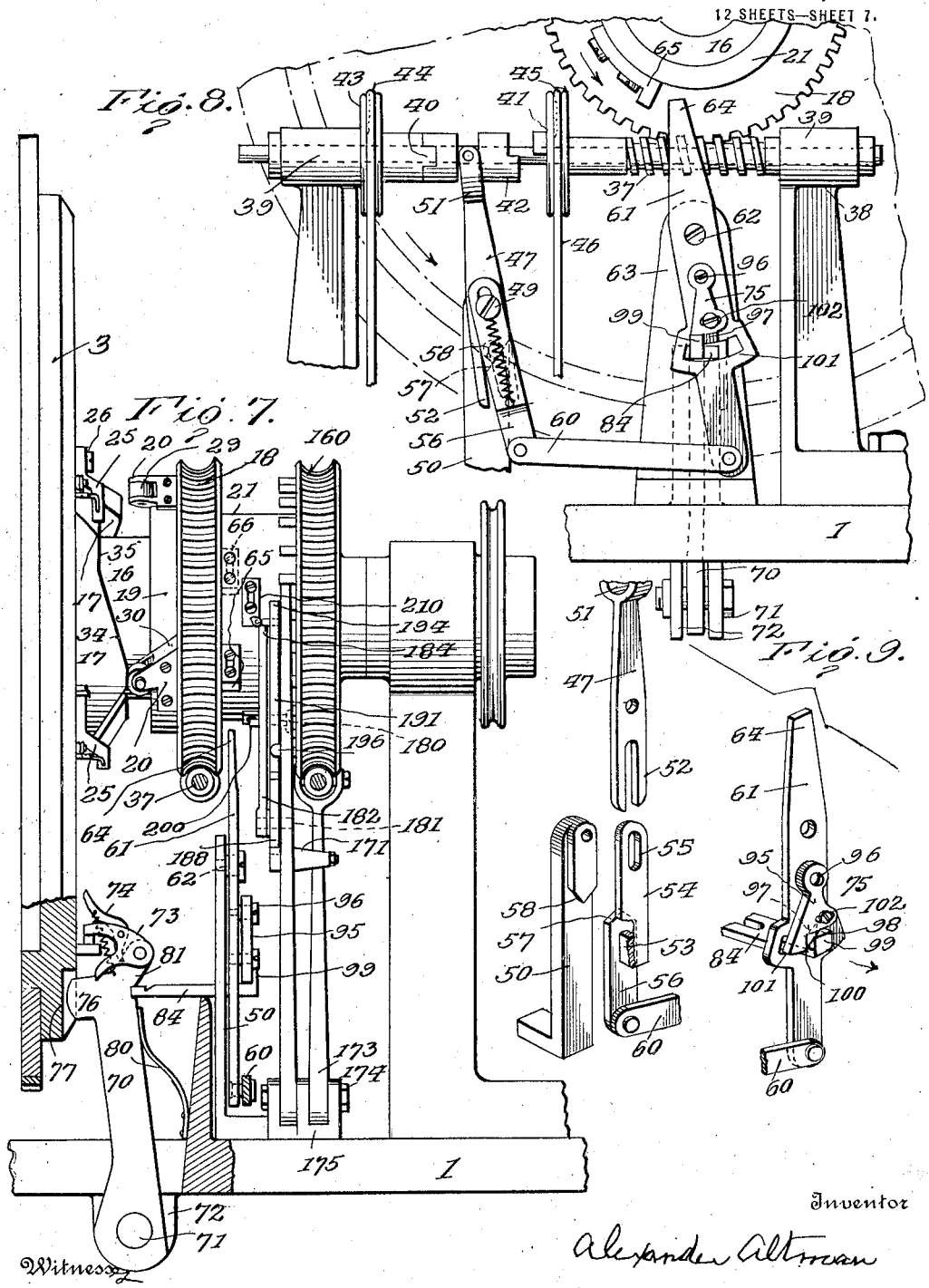

A. ALTMAN.
NEDDLE STRAIGHTENING MACHINE.
APPLICATION FILED AUG. 31, 1917.
1,361,514. Patented Dec. 7, 1920.
12 SHEETS—SHEET 8.
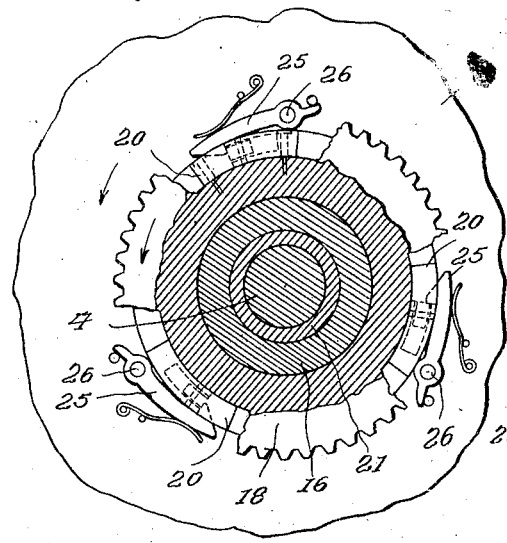
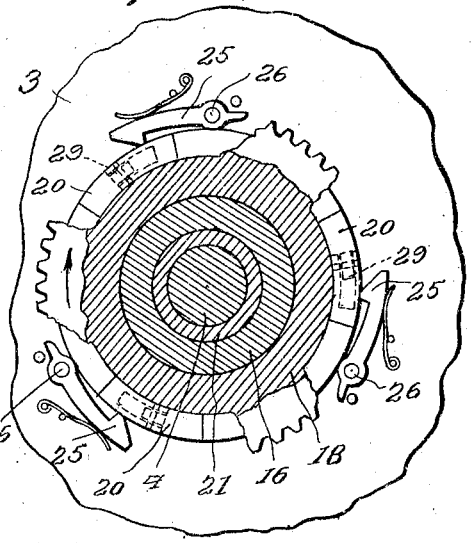
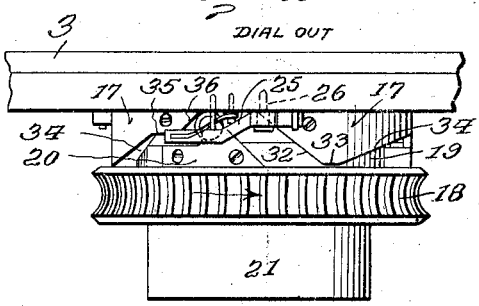
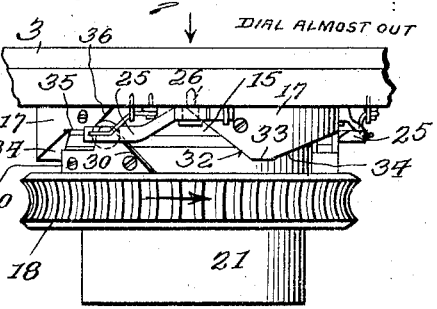
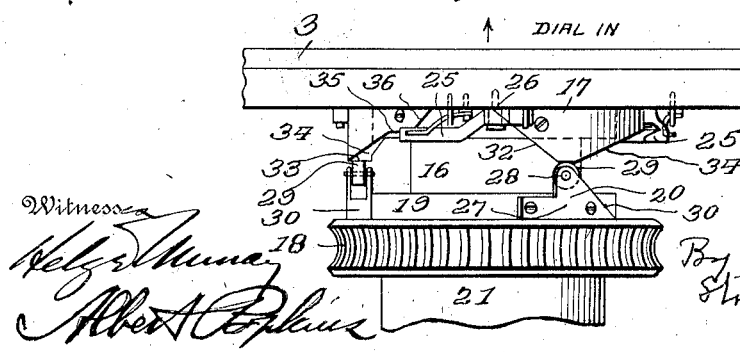

A. ALTMAN.
NEEDLE STRAIGHTENING MACHINE.
APPLICATION FILED AUG. 31, 1917.
1,361,514.
Patented Dec. 7, 1920.
12 SHEETS—SHEET 9.
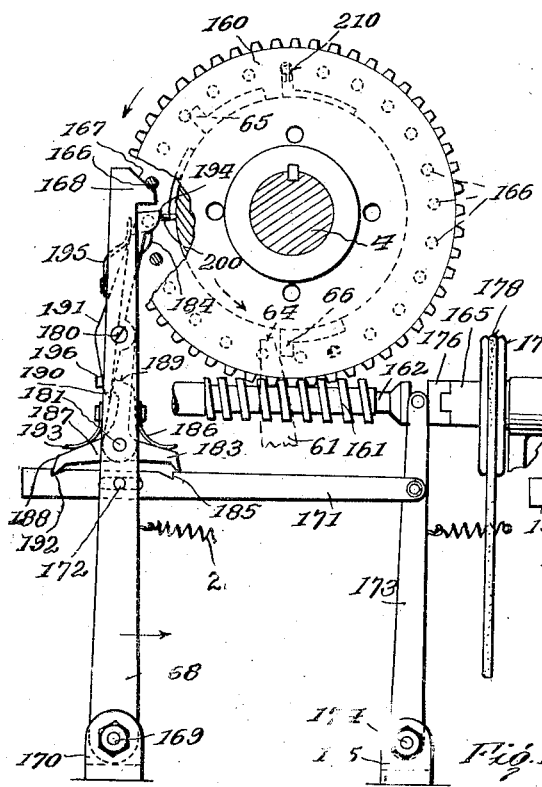
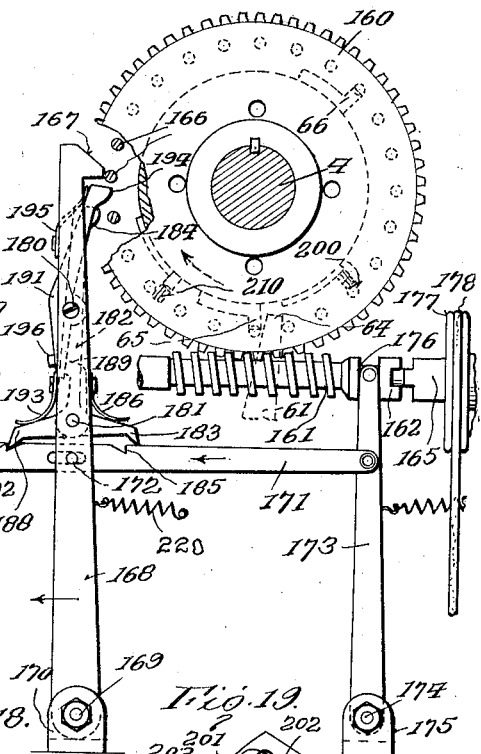
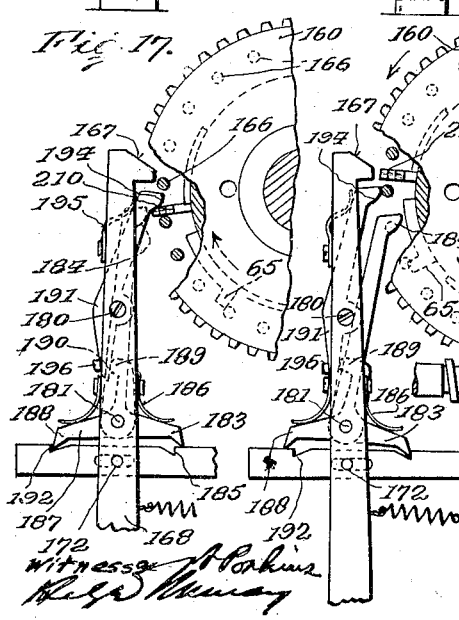
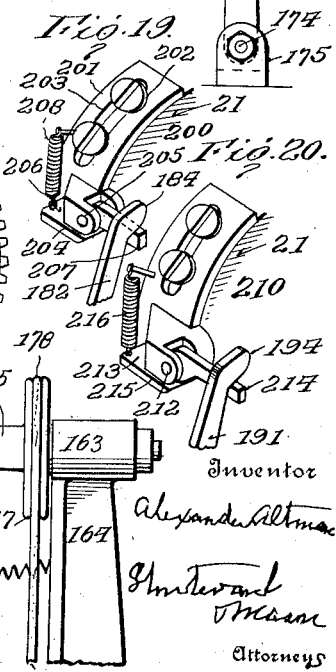

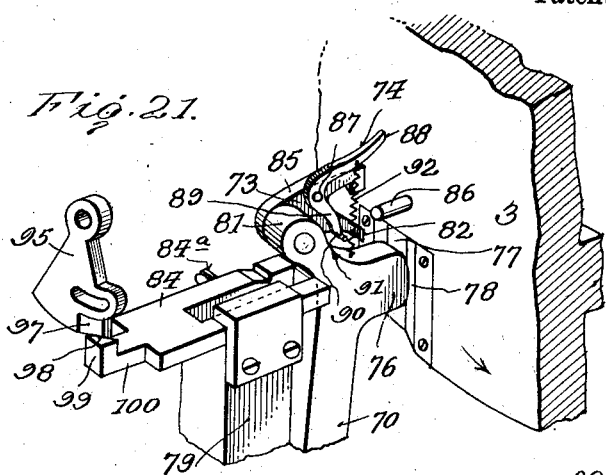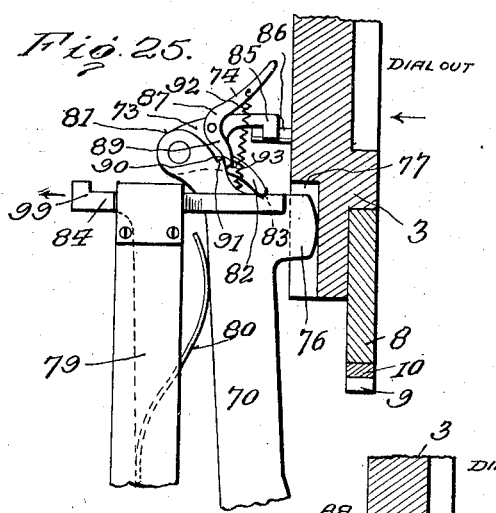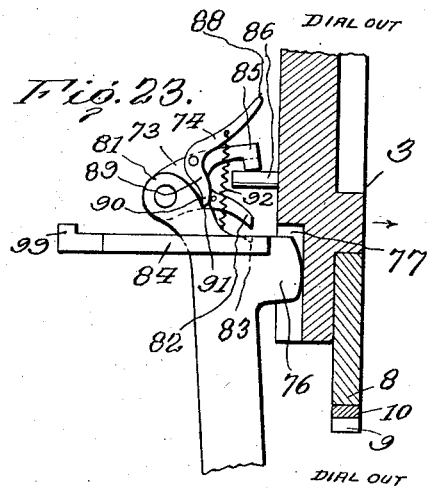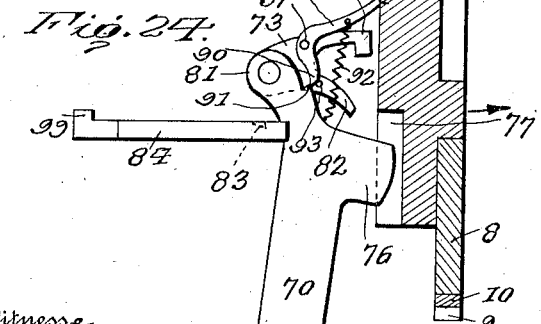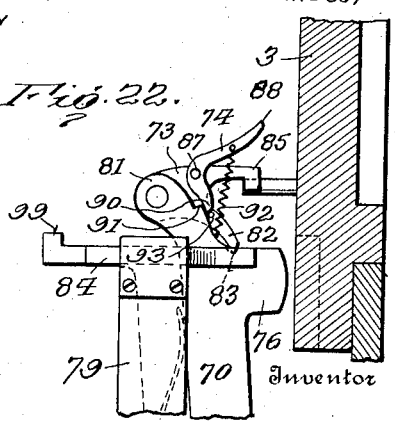

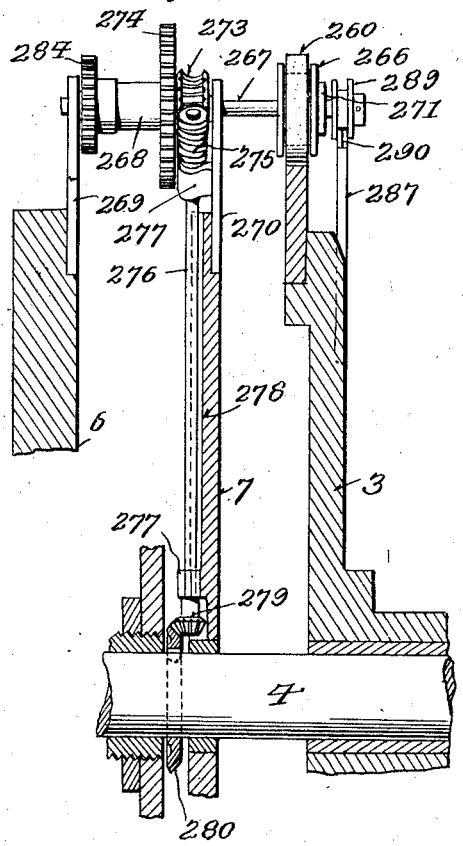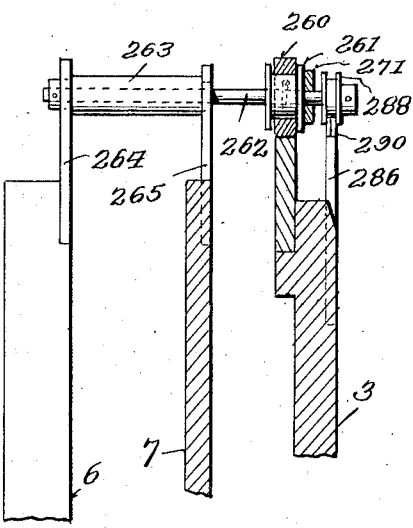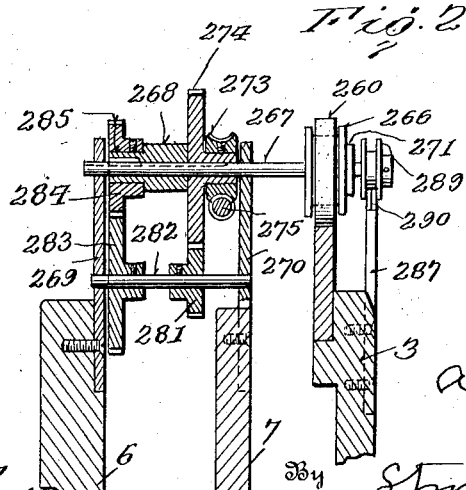

A. ALTMAN.
NEEDLE STRAIGHTENING MACHINE.
APPLICATION FILED AUG. 31, 1917.
1,361,514.
Patented Dec. 7, 1920.
12 SHEETS—SHEET 12.
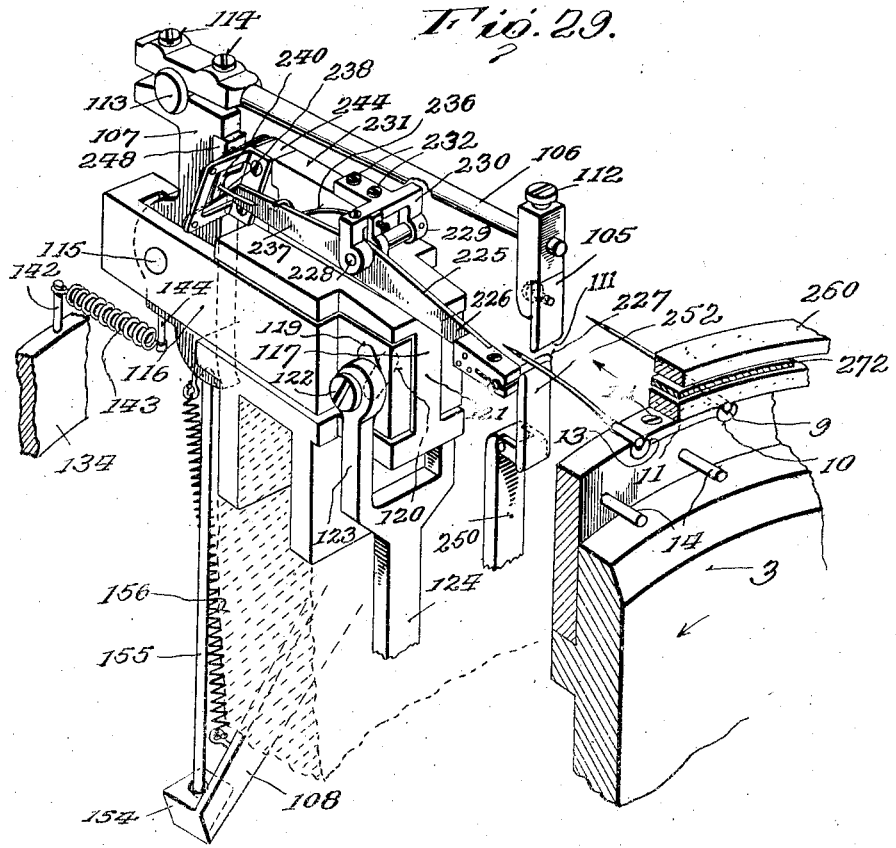
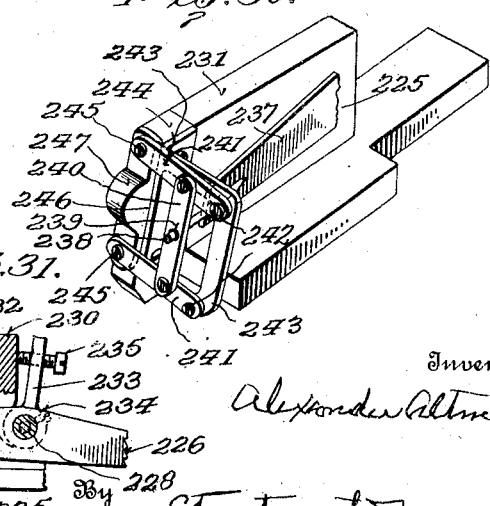

UNITED STATES PATENT OFFICE.

ALEXANDER ALTMAN, OF TORRINGTON, CONNECTICUT, ASSIGNOR, BY MESNE ASSIGNMENTS, TO THE TORRINGTON COMPANY, OF TORRINGTON, CONNECTICUT, A CORPORATION OF CONNECTICUT.

NEEDLE-STRAIGHTENING MACHINE.

1,361,514.   Specification of Letters Patent.   Patented Dec. 7, 1920.

Application filed August 31, 1917. Serial No. 189,130.

*To all whom it may concern:*

Be it known that I, ALEXANDER ALTMAN, a subject of the Emperor of Austria-Hungary, residing at Torrington, in the county of Litchfield, State of Connecticut, have invented certain new and useful Improvements in Needle-Straightening Machines, of which the following is a description, reference being had to the accompanying drawing and to the figures of reference marked thereon.

This invention relates to certain new and useful improvements in needle straightening machines and contemplates more especially a machine of that type set forth and described in my copending application Serial Number 174,936, filed June 15, 1917.

To insure the successful operation of a needle in a high speed sewing machine the curve or crook which results from the tempering process to which the needle is subjected, must be removed and the needle rendered straight.

The herein described invention has been designed to overcome the difficulties now experienced and to provide a machine capable of producing a high grade of work, and at the same time commercially successful in the trade.

An object of this invention is the production of a needle-straightening machine including in combination, a movable needle support designed to receive the needles in predetermined groups, needle-straightening devices, including a plurality of hammers, means including interconnected levers for controlling the operation of the hammers, needle-crook-detecting mechanism associated with each hammer for determining the strength of the blow to be given the needle by the hammer, and means for adjusting the straightening devices and the needle-crook-detecting mechanism.

A further object of the invention is to produce a needle-straightening machine including in combination a needle support for receiving predetermined groups of needles, needle-straightening devices including a plurality of hammers, means for controlling the operation of the hammers with a minimum vibration, and relatively positioned block members upon which the needles are straightened, needle-crook-detecting mechanism connected with each hammer, consisting of a slidably mounted selective blow device for determining the strength of the blow of the hammer as compared with the crook in the needle, and means for continuously revolving the needles while being straightened.

With these and other objects in view, the invention further consists in the combination, arrangement and adjustment of the several mechanisms hereinafter described and pointed out in the appended claims.

In the drawings, which show an embodiment of my invention as designed to operate upon round shank needles—

Figure 1 is a front view of my improved needle-straightening machine;

Fig. 2 is a side view thereof;

Fig. 3 is a rear view of the machine with parts broken away;

Fig. 4 is a vertical longitudinal sectional view through the machine;

Fig. 5 is a vertical transverse sectional view on the line 5—5 of Fig. 4;

Fig. 6 is an enlarged front elevation of the dial, showing the actuating mechanism including the clutches which are alternately engaged for intermittently operating the needle support;

Fig. 7 is a fragmentary side elevation of one end of the machine, illustrating the needle-supporting dial, the locking means for the dial while the needles are being straightened, and the interconnected levers for controlling the operation of the blow wheel which operated the hammers;

Fig. 8 is a view similar to Fig. 6, showing the clutch-actuating mechanism with the opposite clutch engaged to that shown in Fig. 8, and the interconnected locking means;

Fig. 9 is a perspective view of the levers detached and separated for alternating the clutch engagement for intermittently operating the needle support; and also the levers for withdrawing the lock from the needle supporting dial;

Fig. 10 is a detail sectional view of the pawl and ratchet mechanism for intermittently rotating the needle supporting dial, showing the pawls engaged and the dial being rotated in the direction of the arrow;

Fig. 11 is a similar view, showing the pawls disengaged while the dial is locked from rotary movement, while the needles are being straightened;

Fig. 12 is a plan view similar to Fig. 13, showing the needle-supporting dial in its outermost position;

Fig. 13 is a plan view similar to Fig. 12, showing the needle-supporting dial moved all the way in, in the direction of the arrow;

Fig. 14 is a similar view, showing the needle dial as it is nearing its outermost position;

Fig. 15 is a detail view of the means for controlling the operation of the hammers, the said means including a plurality of interconnected levers and tripping devices the position of which is herein illustrated with the clutch engaged and the levers set for the withdrawal of the clutch;

Fig. 16 is a similar view to Fig. 15, showing the position of the levers and the clutch disengaged;

Fig. 17 is a view similar to Fig. 16, showing the tripping device ready to engage one of the levers for allowing the clutch to become engaged;

Fig. 18 is a similar view, showing the clutch engaged and the relative position of the tripping devices;

Fig. 19 is a detached perspective view of one of the tripping latches for operating upon one of the levers;

Fig. 20 is a detached perspective view of the other tripping latch for operating upon another lever;

Fig. 21 is a detached perspective view of the locking means for holding the dial while the needles are being straightened;

Fig. 22 is a view showing the locking lever withdrawn while the needle-supporting dial is being rotated;

Fig. 23 is a view showing the locking device lever released and in engagement with the needle-supporting dial which is ready to be moved inwardly;

Fig. 24 is a view similar to Fig. 23, with the locking lever engaged and the dial moved in, in the direction of the arrow, the retaining pawl for said lever being shown clear of the notch into which it falls when the locking lever is held out;

Fig. 25 is a similar view, showing the locking lever engaged and the needle-supporting dial moved out in the direction of the arrow;

Fig. 26 is a sectional elevation of the needle revolving means and the driving mechanism for operating the same;

Fig. 27 is a similar view illustrating the opposite side of the needle revolving means;

Fig. 28 is a detail sectional view through the intermeshed gears of the needle revolving mechanism;

Fig. 29 is a perspective view of the needle crook detecting mechanism and associated hammer;

Fig. 30 is a perspective view of the selective blow member which determines the strength of the blow to be delivered by the hammer;

Fig. 31 is a detail view of the adjusting screw for the sensitive finger of the needle crook detecting device, and Figs. 32, 33 and 34 are diagrammatic views, showing the relative positions of the hammer, needle crook detecting finger, and the block member upon which the needle is straightened, the position in each figure illustrating the path of movement of the needle as it is drawn beneath the straightening hammer in the direction of the arrow.

The present invention has been primarily designed for use in straightening round-shank needles, as distinguished from flat-shank needles, and comprises among other things a movable needle support arranged to receive and retain the needles in predetermined groups indicated at A, B and C on the face of the needle support; a plurality of needle-straightening devices corresponding to the number of needles in each group; needle crook detecting mechanism associated with each straightening device for determining the strength of the blow to be given in straightening the needle; and relatively positioned block members upon which the needles are straightened, corresponding in number to the needles in the group.

The movable needle support which receives the needles from the feeding device and retains them until after the straightening operation, comprises a dial designed to be intermittently rotated while the needles are being fed thereto, and the group of needles which has been straightened conveyed to the ejecting mechanism; and it is subsequently reciprocated longitudinally of the machine while locked against rotation when the needles are being straightened.

Coöperating with the periphery of the dial adjacent the needle-straightening device is a revolving means comprising an endless band designed to be driven over the shanks of the needles during the straightening operation. This mechanism reciprocates with the dial, as will more fully hereinafter appear.

The needle-straightening devices, as shown in the drawings, are ten in number and comprise as many independently operated hammers; an intermittently rotated blow wheel for operating the hammers, and interconnected levers and tripping latches for controlling the intermittent movement of the blow wheel. The ten hammers are operated simultaneously upon a group of ten needles while the dial is being reciprocated in what will be termed an outwardly direction. The relative strength of the blow of each hammer is determined by the needle crook detecting device which is coöperatively associated with each hammer.

Each needle-crook-detecting device is provided with a highly sensitive finger which is designed to contract with the blade of the needle beneath and to one side of the hammer. All variations, curves or crooks in the needle are readily detected by this finger which is interconnected with a slidably mounted positive selective blow device movable with relation to the hammers, thereby determining the position of the selective blow device for giving to the needle light or heavy blows, depending upon the degree of the crook in the needle.

Referring to the diagrammatic views, Figs. 32, 33 and 34, the needles are straightened as the dial reciprocates outwardly in the direction of the arrow, and as the sensitive finger is designed to remain in contact with the blade which is being revolved, all crooks are hammered out by the time the dial has reached its outermost position.

Coöperating with the straightening and crook-detecting devices are the relatively positioned block members upon which the needles are straightened. These members when adjusted remain fixed with relation to the hammers and sensitive fingers, and are designed to receive the impact from the hammers as transmitted to the needles. Each block member is located beneath a hammer and in close proximity to the sensitive finger.

Referring to the drawings, in which similar reference characters designate corresponding parts, the machine consists of a bed or base 1, suitably supported at a convenient height upon legs 2.

The needle-supporting dial 3 is rotatably and reciprocally mounted upon the shaft 4 journaled in bearings provided in a bearing standard 5 and spaced supporting standards 6 and 7. The standards are preferably bolted to the base 1, and constitute the principal supporting means for the mechanisms to be hereinafter described.

The supporting standard 6 is accurately formed on the top surface and has secured thereto the several needle-straightening and crook-detecting devices, the blow-imparting levers and the associated adjusting devices as will more fully hereinafter appear. The supporting standard 7 is located intermediate the dial 3 and the standard 6, and relatively positions the block members upon which the needles are straightened.

Needle supporting dial.

The dial 3 consists of an outer ring section 8 suitably secured to the body portion of the dial. Formed in the periphery of the section 8 at predetermined spaced stations are a plurality of needle retaining seats of V-shaped grooves 9. These retaining seats are preferably provided in cylindrically shaped members 10, positioned and held in the ring section 8 by spanning plates 11 secured to the said ring section by the screws 12. The ends of the plates 11 are slightly curved, as at 13, to engage a portion of the curved surface of the cylindrically shaped members 10 to retain the latter in position. As shown in the drawings, there are three groups A, B and C of ten needle-retaining seats each, formed in the dial and into which the major portions of the shanks of the needles rest. The remaining portion of the shank of the needle which does not seat within the V-shaped groove 9 protrudes sufficently beyond the periphery of the dial to contact with the band used to revolve the needles in the V-shaped grooves while being straightened.

Protruding from the dial on the ring section 8 is a series of pins 14 designed to operate a needle-feeding means for delivering the needles to the dials conventionally illustrated in Figs. 1 and 6. These pins are arranged in proximity to the three groups of retaining seats and correspond in number to the number of needles fed to each group. Other mechanisms and markings are provided on the dial, and will be hereinafter referred to.

The dial 3 and more especially the main body portion, is provided with stepped hub sections 15 and 16, the former of which supports a series of cams 17 for controlling the reciprocation of the dial, and the latter of which supports a reversing gear 18 having a hub section 19, to which is secured a series of roller mechanisms 20 designed to coöperate with the cams 17, (see Figs. 4, 7, 12, 13 and 14).

The gear 18 is also provided with another hub section 21, to which is adjustably fastened reversing devices and tripping latches to be hereinafter described.

A bushing 22 extends through the hub sections of the dial and fits around the shaft 4. Interposed between the face of the dial opposite the extending hub sections 15 and 16 and the supporting standard 7, is a spring 23, the purpose of which is to insure the return movement of the dial in a direction opposite to the movement thereof given through the action of the cams 17 and roller mechanism 20. The spring is of spiral design and collapses so as to permit the dial 3 to move in close proximity to the supporting standard 7.

Dial rotating and reciprocating mechanism.

Referring to Figs. 2, 4, 7 and 10 to 14, inclusive, the means for rotating the needle-supporting dial and the means for reciprocating the said dial will now be described.

The mechanism for rotating the dial intermittently to convey the needles to the straightening devices and to deliver them to the ejecting means after being straightened, comprises a series of spring-pressed pawls 25 pivoted at 26 to the dial 3. As shown in Figs. 10 and 12, the pawls 25 are designed to engage the offset edges of the roller mechanisms 20, whereupon when the gear 18 is moved in the direction of the arrow in Fig. 10, the dial will be rotated. The three roller mechanisms 20 are secured by screws to the hub section 19 of the gear 18, and include a body portion 27 having a bifurcated end 28 in which is mounted the roller 29. The body portion 27 is provided with a sloping edge 30 and a lateral straight edge 31, against which the pawls 25 engage.

The rollers 29 are designed to operate on the cams 17 secured to the hub section 15 of the dial 3. The three cams 17 are equally spaced about the said dial hub, and comprise each a relatively steep course or surface 32, against which the roller 29 bears for forcing the dial inwardly against the tension of the spring 23; a short dwell course or high point of the cam 33; a slanting course or surface 34 against which the roller bears when the dial is moved outwardly under the action of the spring 23; a short dwell course or surface 35 for momentarily stopping the outward movement of the dial just prior to its outermost position; and a slanting course or surface 36 leading to the flat side of the dial for permitting the dial to move into the outermost reciprocatory position.

While the rollers are bearing on the cam course 34, during which time the dial is moving outwardly, the needles are being straightened.

The coöperating movements of the dial rotating and reciprocating mechanisms are as follows: When the gear 18 is moving in the direction of the arrow shown in Fig. 10 of the drawings, with the pawls 25 engaging the straight edges 31 formed on the roller-supporting members, the dial will be moved in the direction of the arrow, (indicated on the dial 3) in Fig. 10, thereby permitting a new set of needles to be fed from the needle-hopper to the straightening devices and the set already straightened delivered to the needle-receiving pan.

As soon as a new set of needles has been fed to the dial, the latter is locked against rotary movement and the reversing gear 18 is operated by a clutch mechanism to be presently described, and the gear 18 moves in the opposite direction, as indicated by the arrows in Figs. 11, 12 and 14. The movement of the gear 18 in this direction, carries with it the roller mechanisms 20, which, as shown in Figs. 12, 13 and 14 first ride on the flat face of the dial as shown in Fig. 12, then suddenly strike the steep cam course 32 for forcing the dial inwardly until the momentary dwell courses 33 are reached (see Fig. 13), after which the rollers ride along the cam courses 34 while the dial 3 moves outwardly during the straightening of the needles. The rollers then continue to ride along the cam courses 35 and 36, lifting the pawls 25 against the tension of their springs as the sloping surfaces 30 of the roller mechanism strike the tapering nose of each pawl, see Figs. 11 and 14. As the roller mechanism passes beneath the pawls, the latter drop behind the straight edge portions 31, and are located for the succeeding intermittent rotary movement to be given the dial.

*Mechanism for operating the reversing gear.*

Referring to Figs. 2, 6, 7 and 9, the mechanism for controlling the reversing of the gear 18, and thereby the rotary intermittent movement of the dial 3, includes among other things a worm gear 37, keyed to a shaft 38 supported in bearings 39 bolted to the bed of the machine, the said worm being designed to mesh into the gear 18, as clearly shown in Figs. 6 and 8; and oppositely arranged clutches 40 and 41 designed to be alternately engaged by the movable clutch member 42, thereby imparting successive opposite motion to the shaft to which is keyed the worm 38.

The clutch 40 is operated through the pulley 43 secured thereto, and is driven by a belt 44 which transmits motion from a main driving shaft to be hereinafter described, and the clutch 41 is operated through the pulley 45 secured thereto and driven by the belt 46 which is crossed as shown in Fig. 2 and transmits opposite motion from said main shaft to the shaft 38, as will be readily understood.

The movable clutch member 42 is located intermediate the clutches 40 and 41, and is arranged to alternately engage the said clutches for driving the shaft 38 and worm gear 37 in successive opposite directions. The means for moving the intermediate clutch member 42 comprises a clutch lever 47 pivoted at 48 on the stud 49, extending from the standard 50 bolted to the bed of the machine.

The clutch lever, as shown in Fig. 9, comprises an upper forked end 51, which is connected to the movable clutch member 42, and a lower bifurcated end 52 designed to straddle a connecting web 53 of another lever 54, now to be described. The lever 54 is pivotally mounted upon the stud 49, which latter passes through the slot 55 formed in the upper end of the said lever 54. The offset portion 56 of the lever 54 which is attached thereto by the web 53, is provided at its upper end with a V-shaped portion 57 adapted to coöperate with a similarly inverted V-shaped portion 58 on the standard 50. The relatively V-shaped portions 57 and 58 slide upon each other in a manner to be presently described for alternately reciprocating the movable clutch member 42. A spring 59 is connected to the stud 49 and the lever 54 for keeping the relatively V-shaped portions 57 and 58 in engagement. To the lower end of the lever 54 and more specifically to the offset portion 56, is connected a link 60, the opposite end of the said link being connected to a reversing lever 61 pivoted at 62 to a standard 63 bolted to the bed of the machine. The upper end 64 of the reversing lever 61 is located in the path of the reversing devices 65 and 66 which are carried by the hub of the reversing gear 18 and alternately strike the said upper end 64 of the lever, thence through the interconnected mechanisms just described operating to engage either of the two clutches 40 and 41. The lower end of the lever 61 is provided with a mechanism adapted to coöperate with the locking means for holding the dial, and will be presently described in connection with the reference made to that mechanism.

The reversing devices 65 and 66 are relatively spaced and secured to the hub section 21 of the reversing gear 18, by the screws 67. The screws pass through slots 68 formed in the devices 65 and 66, which permits of adjustment, for relatively spacing the reversing devices in timing the reversing of the gear 18 for actuating the dial-rotating mechanism hereinbefore described.

The operation of the mechanism for controlling the reversing of the gear 18 is as follows:

Referring to Fig. 6 of the drawings, the reversing lever 61 is set for actuation by the reversing device 66, the reversing gear 18 moving in the direction of the arrow indicated in said Fig. 6. When in this position the connecting link 60 between the reversing lever 61 and the lever 54 has rocked the clutch lever 47, and the clutch 41 is engaged by the intermediate clutch member 42 giving the direction of rotation to the gear 18, as shown by the arrow in said Fig. 6. The position of the relatively arranged V-shaped portions 57 and 58 is shown in dotted lines in Fig. 6, the spring 59 serving to keep them engaged. As the reversing device 66 strikes the upper end 64 of the reversing lever 61, the said lever is rocked on its pivot 62 to the position shown in Fig. 8. While the lever 61 is being rocked, the link 60 connected to the offset portion 56 of the lever 54 moves the said lever on its pivot stud 49, thereby causing the V-shaped portion 57 to gradually move downwardly on the V-shaped portion 58 against the tension of the spring 59, the web 53 which is straddled by the bifurcated end 52 of the clutch lever 47 serving to move the said lever 47 and disengage the clutch 41.

When the uppermost point of the V-shaped portion 57 reaches the lowermost portion 58, the clutch 41 has become disengaged, and as the movement of the lever 54 continues for a short distance, the points of the coöperating V-shaped portions clear each other and the spring 59 pulls the lever 54 upwardly, the V-shaped portion 58 riding on the inverted V-shaped portion 57, and, operating through the clutch lever 47, engages the movable clutch member 42 with the clutch 40, as shown in Fig. 8. When in this position the shaft 38 carrying the worm 37 rotates in an opposite direction, and the reversing gear 18 revolves in the direction of the arrow shown in Fig. 8 until the reversing device 65 strikes the upper end 64 of the lever 61, and the foregoing reversing operation is repeated.

The reversing of the direction of rotation of the gear 18 causes the hereinbefore described intermittent rotation of the needle-supporting dial, as well as the reciprocating movement thereof, as heretofore explained, through the coöperation of the cams 17 and roller mechanism 20.

*Needle dial locking mechanism.*

Referring to Figs. 4, 6, 8 and 21 to 25 inclusive, the means for locking the needle-supporting dial against rotation while the said dial is being reciprocated, during a portion of which time the needles are straightened, comprises a locking lever 70 pivoted at 71 between depending ears 72 provided on the under side of the bed of the machine; a controlling pawl 73 and tripping lever 74, and lock-withdrawing or releasing mechanisms 75, coöperatively associated with the reversing lever 61, as hereinbefore referred to.

The locking lever 70 is provided with an engaging nose 76 designed to successively drop into recesses 77 provided in the dial 3, as it is intermittently rotated. Sloping faces 78 are arranged on one side of the recesses for facilitating the ready and sure engagement of the nose of the locking lever when it is released, for holding the dial in locked position while it is being reciprocated.

The locking lever swings upon its pivot 71 in a slotted casting 79, and is provided with a spring 80 for normally forcing the nose 76 of the lever into one of the recesses 77 formed in the dial. To an upper lug 81 of the locking lever is pivoted the controlling pawl 73, one arm 82 of which is designed to operate in conjunction with a recess 83 formed in a slide 84, and the other arm 85 of which is designed to be engaged successively by one of three pins 86 carried by the dial.

The tripping lever 74 is pivoted at 87 to the controlling pawl 73 and is provided with an upper arm 88 and a lower arm 89 provided with an engaging nose 90 designed to rest at certain times in a recess 91 formed in the edge of the lug 81, as will be presently described. A spring 92 is connected to the arm 88 of the tripping lever 74, and the arm 82 of the controlling pawl 73, and serves to seat the nose 90 of the tripping lever into the recess 91 or against a stop pin 93 protruding from the arm 82 of the controlling pawl.

As has been hereinbefore stated, the locking lever is designed to hold the dial 3 against rotary movement while the said dial is reciprocated and the needles straightened. During the intermittent rotary movement of the dial, however, the locking lever must be withdrawn, and the operation of the engaging and withdrawing of the said locking lever will now be described.

Referring more especially to Figs. 21 to 25, inclusive, the several positions of the locking lever 70, controlling pawl 73 and tripping lever 74 are illustrated. In the position shown in Fig. 22 the locking lever is ready to be released, one of the pins 86 being shown just ready to engage the arm 85 of the controlling pawl and lift the other arm 82 out of the recess 83 to permit the locking lever to be forced against the dial by the spring 80. In this position the nose 90, of the tripping lever 74 is out of the recess 91. The dial in its rotary movement brings the pin 86 under the arm 85 and releases the locking lever, so that it is forced against the face of the dial by the action of the spring 80 gradually finding its way down the sloping side 78 into the recess 77. This position is shown in Fig. 23 of the drawings, with the dial in its outermost reciprocatory position, ready to move inwardly. As the controlling pawl 73 is lifted by the pin 86, the tripping lever is also lifted and the nose 90 on the arm 89 drops into the recess 91, thereby keeping the arm 82 of the controlling pawl elevated and away from the recess 83 in the slide 84 from which it has just been lifted.

As the dial moves inwardly, as indicated by the arrows in Figs. 23 and 24 the locking lever 70 swings on its pivot 71 remaining in engagement with the dial, and as the dial approaches its innermost position, the outer end of the arm 88 of the tripping lever bears against the face of the dial, slightly lifting the tripping lever until its nose 90 is clear of the recess 91, thereby permitting the arm 82 of the controlling pawl to drop into a path for engagement with the recess 83 in the slide 84, as the dial moves outwardly to the position shown in Fig. 25. The purpose of this is to allow the pawl arm 82 to seat within the recess 83 of the slide 84, so that the withdrawing mechanism 75 for pulling the locking lever 70 out of the recess 77 in the dial can readily coöperate with the said slide 84 and unlock the dial for rotary movement.

Referring to Fig. 9, the withdrawing mechanism 75 is carried by the reversing lever 61 and comprises a lever 95 fixed at 96 to the said lever. The lower edge of the lever 95 is provided with a beveled surface 97 designed to coöperate with a similar mating surface 98 formed on the inner side of a lug 99 provided on the slide 84. The slide 84 has a reduced end 100 which extends through an arcuate opening 101 formed in the reversing lever 61. The lever 95 is adjustably secured to the reversing lever 61, by means of the screw and slot connection 102, as shown in Fig. 9. In operation it will be seen that as the reversing lever is actuated by one or the other of the reversing devices 65 or 66, the relatively fixed lever 95 will be moved with the lever 61, and as the beveled face 97 wipes against the beveled face 98 formed on the lug 99 of the slide 84, the latter will be drawn outwardly in the direction of the arrows shown in Figs. 9 and 25.

The operation of this withdrawing mechanism 75 is relatively adjusted and timed with the gear 18 and its associated parts, for permitting the rotation of the dial as will be understood.

*Needle straightening devices.*

Referring to Figs. 3, 4 and 29, the needle-straightening devices are supported upon the upper arcuate edge of the standard 6, and are designed to operate when the dial 3 is in locked position and is reciprocated outwardly. They comprise among other things, a plurality of hammers 105, mounted upon arms extending from pivoted hammer levers 107; a series of blow levers 108 pivoted at 109 to the standard 6 adapted to coöperate with the aforesaid hammer levers 107; a blow wheel 110 mounted upon one end of the shaft 4, and means including a plurality of interconnected levers and tripping latches, for controlling the operation of the blow wheel and in turn the operation of the hammers 105.

The hammers 105 are provided with striking edges 111 fastened to the body portion of each hammer, and are relatively located to the sensitive finger of the crook-detecting mechanism and block members upon which the needles are straightened, both of which mechanisms will be presently described.

Inasmuch as the ten straightening devices or hammers shown are similar in construction and operate simultaneously, a description of but one will be given. Referring more particularly to Figs. 29, 30 and 31, each straightening hammer 105 is adjustably secured upon the arm 106 by the screw 112.

The arm 106 is relatively movable to the hammer lever 107 and when adjusted elevates or lowers the hammer 105 away from or toward the needle. This adjustment is fixed with relation to the hammer lever 107, and is made possible by the construction shown, in which an oppositely flanged pivot stud 113 is interposed between the hammer arm 106 and lever 107. Adjusting screws 114 are located upon either side of the pivot stud 113, and when manipulated serve to rock the arm 106 for adjusting the hammer 105, after which they are clamped down and the arm 106 is relatively fixed with relation to the hammer lever 107.

Each hammer lever 107 is pivoted at 115 to a bifurcated slide 116 adjustably movable in the base or supporting member 117 secured to the reduced portion 118 of the standard 6. The slide 116 is provided at its forward end with angularly disposed slots 119, arranged in the opposite side walls of the slide and designed to coöperate with an oppositely inclined or angular slot 120, formed in the center wall 121 of the base or supporting member 117. Working in these coöperating slots 119 and 120 is screw or pin 122 secured to the upper forked end 123 of an adjusting rod 124 (see Fig. 5). The ten rods 124, corresponding in number to the straightening devices, have their lower ends 125 offset as at 126 and disposed with an eccentrically and spirally designed groove 127 formed in the wall of an adjusting disk 128. The adjusting disk 128 is screw-threaded upon the bushing member 129, and is held in adjusted position by the locking nut 130, also screw-threaded upon the bushing as shown in Fig. 4.

By this construction it will be seen that when the locking nut 130 is loosened, the adjusting disk 128 can be turned by a spanner wrench or the like, thereby causing the groove 127 therein to shift the relative positions of the rods 124 in either an upward or downward direction simultaneously, and consequently affects the slide 116 through the pin 122 and slot connections 119 and 120 for locating the hammers. It will be seen that as the slide 116 is moved, the pivotal point 115 of the hammer lever 107 will be changed and this together with the curved surface 147 of the nose 145 of the hammer lever, which is constantly in contact with a coöperating surface 146, provided on the blow lever 108, relatively lifts or lowers the hammers. The rods 124 are moved simultaneously and all of the hammers are given the same relative location desired, after which the locking nut 130 is screwed against the face of the adjusting disk 128 and the hammers are ready for operation.

A further adjustment is afforded the straightening hammers, said adjustment being more especially designed to increase or decrease the strength of the blow of the hammers.

Referring to Figs. 3 and 4, this adjusting means is supported upon threaded rods 131 secured to the standard 6 and projecting outwardly thereof, as shown in Fig. 4. Coöperating with the threaded ends 132 of the said rods are internally threaded sleeves 133 movable thereupon. The threaded sleeves 133 are carried by a yoke or supporting bar 134 through which the reduced ends or shafts 135 of the said sleeves pass. On the ends of the shafts 135 are keyed worm gears 136, which together with the flanges 137 on the sleeves cause the yoke or supporting bar 134 to move with the sleeves 133.

Meshing with the worm gears 136 are worms 138, keyed to a shaft 139 journaled in bearings 140 bolted to the yoke or bar 134. These worms are relatively pitched so that as the shaft 139 is turned by the handle 141, the sleeves 133 (of which there are three), move simultaneously upon the threaded ends 132 of the rods 131 in the same direction. Provided on the upper edge of the yoke or bar 134 is a plurality of pins 142 to each of which is connected one end of a spring 143. The opposite end of each spring 143 is connected to a depending pin 144 provided on each of the hammer levers 107. By this construction it will be seen that the nose 145 of each of the hammer levers 107 is kept in contact with a coöperating surface 146 formed on the blow levers 108 as shown in Figs. 4 and 29, and the adjustment of the slide 116 hereinbefore referred to will permit the curved under surface 147 on the nose 146 to shift the position of the hammer lever and elevate or lower the hammers.

When it is desired to increase the strength of the blow of the hammers, the handle 141 is operated and the shaft 139 turned to move the threaded sleeves 133 outwardly in the direction of the arrow indicated on Fig. 4. The tension upon the springs 143 being increased the stronger will be the blow imparted to the hammer levers 107 through the blow lever 108 by the blow wheel 110.

Referring now to Figs. 3 and 4, the blow wheel 110 consists of a flanged section 150 having secured thereto a plurality of striking members 151. These striking members are preferably partially countersunk into the surface of the flange section at its outer edge, and are held in place by screws 152. They are beveled off as at 153 for coöperation with the arms 154 of the blow levers 108. The striking members 151 are equally spaced upon the blow wheel and are designed to move beneath the offset portions 154 of the blow levers 108, hereinbefore referred to, for lifting the said levers and transmitting the movement to the hammer levers 107 which in turn are connected to the hammers 105.

Rods 155 are interposed between the hammer levers 107 and the lower end of the blow levers 108, and are held in position by means of springs 156 secured to said blow and hammer levers respectively.

The end of each rod is preferably rounded and positioned in correspondingly formed recesses in the hammer and blow levers. By this construction all vibration of the parts is reduced to a minimum and the relative effectiveness of the hammers is materially increased.

The blow wheel is keyed to the shaft 4 as shown in Fig. 4 and further held in position thereon by the cap 157 which may be screwed or otherwise fastened to said shaft. It will be readily understood that various size blow wheels can be substituted for heavier or lighter work, and in the event that a different size blow wheel should be employed, the cap 157 is removed and the substituted blow wheel keyed and fastened to the shaft as shown.

*Mechanism for controlling operation of blow wheel.*

Referring to Figs. 4, 7 and 15 to 20 inclusive, the controlling means for operating the blow wheel during the hammering operation and straightening of the needles, comprises a worm gear 160, keyed to the shaft 4; driving mechanism including a worm 161 in mesh with the gear 160, keyed to the shaft 162. This shaft 162 is journaled in bearings 163 provided in the standard 164 bolted to the bed of the machine; a series of inter-connected levers for operating the clutch 165; and means including tripping latches for setting and operating the aforesaid levers.

The worm gear 160 is provided with a plurality of projecting pins 166 designed to operate upon the nose 167 of a master clutch controlling lever 168 for disengaging the clutch 165. The master clutch lever 168 is pivoted at 169 between upwardly extending ears formed on a pivot block 170 bolted to the bed of the machine. Pivotally mounted upon the said lever 168 near its upper end is a plurality of interconnected levers, designed to coöperate with tripping latches and oppositely arranged notches formed in the sliding link connection 171 one end of which latter is loosely secured to the lever 168 by the pin and slot connection 172, and the other end of which is fastened to the clutch lever 173.

The clutch lever 173 is pivoted at 174 in a block 175 bolted to the bed of the machine, and is provided at its upper end with a movable clutch member 176 slidably mounted upon the shaft 162 and designed to engage a mating member to form the clutch 165. The pulley 177 is secured to one clutch member of the clutch 165 and when the clutch is engaged transmits motion from the main driving shaft 310 to be hereinafter referred to, through the belt 178.

The plurality of interconnected and associated levers pivotally mounted upon the master clutch lever 168 will now be described. Referring more particularly to Figs. 7 and 15 to 20, inclusive, the two pivot studs upon which the levers are mounted are indicated at 180 and 181. The lever 182 is pivoted on the stud indicated at 181, and is of the bell crank type having a lower end which forms the pawl 183 and an upper end formed with an engaging nose 184. The pawl 183 is coöperatively associated with the notch 185 provided in the sliding link connection 171 as will be presently described.

A spring 186 secured to the master lever 168 bears upon the upper surface of the pawl 183 for seating the said pawl in the notch 185 and throwing the upper engaging nose 184 in the path of travel of one of the tripping latches to be later described.

The lever 187 is pivoted on the stud indicated at 181 also, and is of the bell crank type having a lower end which forms the pawl 188 and an upper end formed with a nose 189 designed to coöperate with the lower arm 190 of another lever 191 pivoted on the stud shown at 180, and to be presently described. The pawl 188 on the lever 187 is coöperatively associated with the notch 192 provided in the sliding link connection 171. A spring 193 secured to the master clutch lever 168 bears upon the upper surface of the pawl 188 for seating the said pawl in the notch 192 and permitting the coöperation of the nose 189 and the lower arm 190 of the lever 191.

The lever 191 is pivotally mounted upon the stud indicated at 180 and in addition to its lower arm 190, is formed with an upper arm having an engaging nose 194 designed to be relatively positioned in the path of the other tripping latch. A spring 195 is secured to the master clutch lever 168 and serves to keep the lever 191 with its nose 194 directed toward the tripping latch, and its lower arm 190 against the stop 196 formed on the lever 168.

The tripping latches which coöperate with the levers just described, actuate the pawls 183 and 188 and are adjustably secured to the hub section 21 of the reversing gear 18 hereinbefore described, oscillating therewith and tripping the levers 182 and 191 in a manner now to be described. The tripping latch 200 shown in detail in Fig. 19 of the drawings, coöperates with the engaging nose 184 of the lever 182, upon the lower end of which is formed the pawl 183. The latch 200 comprises a base plate 201 curved to fit the hub section 21 of the gear 18 and secured thereto by the screws 202 which pass through the slot 203 designed to facilitate adjustment; and a tripping lever 204 pivoted at 205. The lever 204 consists of laterally extending arms 206 and 207 the former of which is connected to a spring 208 fastened to the base plate 201, and the latter of which is relatively located for contacting with the nose 184 of the lever 182 as shown in Fig. 22.

The tripping latch 210 is of the same general construction comprising a slotted base plate 211 secured to the hub section 21 of the gear 18 in spaced relation to the tripping latch 200 for their coöperative action.

The latch 210 is illustrated in Fig. 20 and includes a pivoted lever 212 having arms 213 and 214 respectively, the former being normally held against the shoulder 215 by the spring 216 and the latter extending laterally for engagement with the nose 194 of the lever 191.

The operation of the foregoing mechanism for controlling the operation of the blow wheel, and thereby operating the hammers follows.

Referring particularly to Figs. 15 to 20 several positions of the controlling mechanism are shown. The needle supporting dial 3 has been moved very close to its outermost reciprocating position, approximately indicated in plan view by Fig. 14, the needles being now straightened close to the shank. The blow wheel 110 keyed to the shaft 4 is still operating because of the engagement of the clutch 165. Motion is being transmitted from the driving belt 178 to the worm gear 160. When the reversing latch 66 shown in Fig. 6, strikes the upper end 64 of the lever 61, the direction of rotation of the gear 18 is reversed as indicated by the direction of the arrow shown in Fig. 18. At substantially the time of this reversing of the gear 18 the lever 207 of the tripping latch 200 contacts with the nose of the lever 182 rocking the said lever on its pivot 181 and lifting the pawl 183 out of the notch 185 at which time the spring 220 connected to the master clutch lever 168 and the standard 5, pulls the said master clutch lever in the direction of the arrow indicated in Fig. 18, permitting the engaging nose 167 thereof to rest against and within the path of travel of the pins 166 and at the same time allows the pawl 188 to drop into engagement with the notch 192 in the sliding link connection 171. The operation of the tripping latch lever 207 may occur slightly in advance of the reversal or at or about the same time.

The clutch 165 being still engaged, the continued movement of the worm gear 160 causes the pins 166 to bear against the beveled nose of the master clutch lever and rocks it on its pivot which action together with the pawl 188 having dropped into the notch 192, withdraws the clutch member 176 of the clutch 165 in the direction of the arrow, to the position shown in Fig. 16. As soon as the clutch 165 becomes disengaged the worm gear 160 stops rotating and in turn the shaft 4 and blow wheel 110 also stop, thereby terminating the hammer operations upon the needles. When the straightening or hammering operation ceases the dial 3 is in its outermost position.

It being understood that the reversing or oscillation of the gear 18 is a continuous operation, the position indicated in Fig. 16 shows the reversing device 65 having just struck the upper end of the lever 61 and has caused the gear 18 and the tripping latch 200 and 210 to move in the direction of the arrow shown in dotted lines.

At the time of the dropping of the pawl 188 into the notch 192, the lever 187 is rocked on the pivot 181 and the nose 189 of said lever forces the arm 190 of the lever 191 against the stop 196, with the upper arm 194 of said lever projecting into the path of travel of the tripping latch 210. As the tripping latch 210 continues to move in the direction of the arrow shown in dotted lines in Figs. 19 and 20, the said latch strikes the nose 194 of the lever 191 as shown in Fig. 20, thereby rocking the said lever 191 on its pivot 180 so that its lower arm 190 moving the nose 189 of the lever 187, causes the pawl 188 to be lifted out of the notch 192 in the sliding link connection 171 and permits the clutch member 176 to become engaged with the clutch lever 173 and the standard 164.

It will be seen that the construction of the tripping latches 200 and 210 permit the respective spring tensioned levers 207 and 214 to swing by the respective noses 184 and 194 of the levers 182 and 191.

As soon as the clutch 165 becomes engaged the worm gear 160 is again driven in the same direction, namely that of the arrow shown in full lines in Figs. 15 and 18 and the hammers are operated for straightening the needles. The relative intermittent rotary movement of the dial occurs while the worm gear 160 is stationary, and the gear 18 is moving in the direction of the arrow in dotted lines in Fig. 18.

When the pawl 188 is lifted from the notch 192 and the clutch 165 becomes engaged, the sliding of the link connection 171 in the direction of the arrow shown thereon in Fig. 18, with the clutch lever 173 causes the pawl 183 to drop into the notch 185 so as to set the levers 182 and more especially the arm with the nose 184 for tripping, by the latch 200 in a subsequent operation.

*Needle crook detecting mechanism.*

Referring to Figs. 4, 29, 30 and 31, the needle crook detecting mechanism comprises a plurality of sensitive fingers designed to contact with the blade of each needle upon its side opposite to the hammer and in close proximity thereto and a selective blow member interconnected with each sensitive finger adapted to receive the blow from the hammer lever 107.

The sensitive finger 225 comprises a forwardly extending arm 226 to which is secured in any desirable manner the needle contacting finger 227. The needle contacting finger comprises a round bar clamped between the split end of a block secured to the end of the forwardly extending arm 226. The sensitive finger 225 is secured to a shaft 228 mounted in bearings 229 formed on the end of a supporting bracket 230 secured to the upper wall 231 of the supporting member 117 by screws 232.

An adjusting device for positioning the sensitive finger with relation to the needle to be straightened is also provided, and comprises an arm 233 the hub section of which is secured to the shaft 228 by a screw 234. A screw 235 is provided in the upper end of the arm 233 and bears against the bracket 230. An adjustment of the screw 235 determines the relative amount of movement of the contacting finger in an upward direction against the blade of the needle.

A spring 236 secured to the bracket 230 bears downwardly upon the rearwardly extending arm 237 of the sensitive finger and serves to keep the contacting finger in touch with the blade of the needle.

The rearwardly extending arm 237 is provided with a protruding rod 238 the end of which extends within an opening 239 formed in a cross bar 240. The cross bar 240 is loosely connected to parallel links 241 (see Fig. 30), which in turn are pivotally mounted at 242 to a bracket 243 secured to a block 244 fastened to the wall 231. The opposite ends of the parallel links 241 are loosely connected at 245 to the selective blow member 246 which is movable upon the block 244.

The selective blow member 246 is formed with an enlarged blow receiving portion 247, which as herein shown is of semi-circular formation. From the foregoing construction it will be seen that any movement transmitted through the sensitive finger 225 will be imparted to the parallel links 241 which in turn act to shift the selective blow receiving member in an upward or downward direction. The movement of the selective blow device is in a plane slightly off the vertical, as shown in Fig. 2 for coöperation with a blow imparting block 248 secured to the hammer lever 107. This blow imparting member or striking block 248, and the block 244 upon which the selective blow member moves can be readily removed as they wear, and new ones inserted.

The operation of the needle crook detecting mechanism follows:

When the needles to be straightened are brought inwardly by the dial 3 between the hammers 105 (which stop in elevated positions after prior operations), and the sensitive finger 225; the finger 227 is brought into contact with the blade of the needle beginning at a point near its shank as diagrammatically illustrated in Fig. 32. The spring 236 serves to keep the contact finger 227 sensitively against the needle blade. While the needles are being straightened they are revolved by a mechanism to be hereinafter described.

As the contact finger 227 is vibrated by the irregularities and crooks in the blade of the needle as the said needle is drawn outwardly in the direction of the arrow shown in Figs. 32, 33 and 34, the movements of this vibration are transmitted to the selective blow member 246 by the rocking of the sensitive finger and its manipulation of the parallel links 241 secured to the said selective blow member 246.

The position of the selective blow member and more especially the blow receiving portion 247 during the vibratory movement determines the relative strength of the blows to be given the needle by the hammer.

It will be understood that the greater the crook in the needle the heavier must be the blow, consequently the hammer levers 107 will operate to impart heavier blows to the selective blow members, when the blow receiving portion 247 is shifted downwardly upon the block 244, by the vibration of the sensitive finger 226, and reversely when the crooks are slight, the shifting of the blow receiving portion 247 in an upward direction will arrest the movement of the hammer levers 107 and thereby cause light blows to be delivered to the needle blades by the hammers.

*The block members upon which the needles are straightened.*

Coöperating with the straightening hammers and the crook detecting mechanism are relatively adjustable coöperating members against which the needle is driven by the blows of the hammer and upon which it is straightened.

Referring to Figs. 4 and 29 the block members upon which the needles are straightened comprise a series of bars 250 adjustably mounted upon the standard 7. The bars 250 are retained upon the standard by a plate 251 fastened by screws.

The upper end of each bar 250 has secured thereto a block member 252 upon the upper edge of which the needle rests when being straightened. The block member 252 may be suitably guided by the upper portion of the standard 7 and the plate 253. The lower ends of the bars 250 are offset as at 254 into an eccentrically and spirally arranged groove 255 (similar to the groove 128 illustrated in Fig. 5) on an adjusting disk 256 screw threaded upon the threaded bushing 129. A locking nut 257 bears against the face of the adjusting disk 256 and serves to hold it in adjusted position.

In operation the locking nut 257 is loosened and the disk 256 turned by a spanner wrench or other device, thereby causing the bars 250 to be moved simultaneously by the action of the spirally arranged groove 255, and the block members 252 upon which the needles are straightened are relatively elevated or lowered as the case may be. It is desirable to adjust these blocks 252 with relation to the straightening hammers, the crook detecting mechanism and the needle supporting dial which presents the needle, so that the blade of the needle will be straightened in alinement with the shank of the needle.

*Needle revolving mechanism.*

Referring to Figs. 1, 2, 26, 27 and 28 the mechanism for revolving the needles while they are being straightened comprises an endless band or belt 260 preferably of rubber or other similarly acting material which passes over a pulley 261 secured to a shaft 262 slidably supported in the bearing sleeve 263 which is mounted between two standards 264 and 265 secured to the supporting standards 6 and 7 respectively, and over a pulley 266 similarly fastened to a shaft 267 and slidably secured to and within a sleeve 268 mounted in standards 269 and 270 secured to the standards 6 and 7 respectively.

The belt 260 is of square or rectangular cross section and rests upon the periphery of the needle dial as it intermittently rotates. When the needles are seated in the V grooves in the periphery of the dial the belt 260 is designed to contact with the shank of the needle which extends a short distance out of the groove, and when the belt is moved the needles are revolved. A needle guard 271 is supported between the pulleys 261 and 266 and may be provided with a flange 272 designed to rest between the central portions of the belt or band and separate them as shown in Fig. 4.

The means for driving the band or belt 260 comprises a worm gear 273 secured to the hub of the gear 274, the said worm gear 273 being designed to mesh with a worm 275 keyed to the upper end of a shaft 276 journaled in bearings 277 one of which is secured to the standard 7 and the other of which is secured to the standard 270 (see Fig. 26).

The shaft 276 is partially positioned in the groove 278 formed in the standard 7, and has keyed to its lower end a beveled pinion 279 adapted to mesh with a beveled gear 280 keyed to the shaft 4.

It will be obvious that when the shaft 4 is rotated by the mechanism controlling the operation of the blow wheel hereinbefore described, motion will be transmitted through the beveled gear 280 to the beveled pinion 279 and the shaft 276 will be rotated, thereby driving worm 275 and the meshing worm gear 273 on the hub of the gear 274 loosely mounted on the shaft 267 for imparting rotary movement to the pulley 266 over which the band passes. The band continues to move over the shank of the needles for revolving them while being straightened and as long as the shaft 4 is rotated.

The means for determining the speed at which the needles are to be revolved and also the gearing for imparting the rotary movement to the shaft 267, comprises a gear 281 adapted to mesh with the gear 274 and secured to a cross shaft 282 mounted in the standards 269 and 270 respectively.

Secured to the cross shaft 282 is another gear 283 which is designed to mesh with a smaller gear 284 secured to the reduced hub section 285 of the sleeve 268 which latter is keyed to the shaft 267 as shown in Fig. 28. Rotary movement is transmitted through the larger gear 274 driven by the worm gear 273, to the smaller gear 281 secured to the shaft 282, which latter in turn revolves the larger gear 283 meshing with the smaller gear 284. The smaller gear 284 being secured to the hub section 285 which is keyed to the shaft 267, it will be seen that the said shaft 267 is rotated, causing the pulley 266 to revolve and thereby move the band or belt 260 over the shanks of the needles. The form of gearing herein shown has been found to be advantageous in that by changing the gears 273, 281, 283 and 284 varying speeds of rotation may be obtained. This is desirable in maintaining a substantially uniform speed of rotation of the needles, the size of the shanks of which vary according to the style and size of the needle being straightened.

During the straightening operation the dial 3 is given a reciprocatory movement and it is necessary that the band 260, and pulleys 261 and 266 move therewith in order to keep the band 260 upon the shanks of the needles. The means for accomplishing this includes spaced arms 286 and 287 secured to the face of the needle dial (see Fig. 1), which are designed to engage the flanges of pulleys 288 and 289, respectively. The arms 286 and 287 are each provided with tapered edges 290 for insuring their engagement between the flange of the pulleys 288 and 289. There are three groups of the arms 286 and 287, each one being designed to successively engage the flanged pulleys 288 and 289 as the dial is rotated.

Referring to Figs. 26 and 27, it will be seen that as the dial is moved inwardly the pulleys 288 and 289 which are keyed to the respective shafts 262 and 267, and between the flanges of which pulleys extend the arms 286 and 287, cause the said shafts 262 and 267 to be moved through the sleeves 263 and 268 respectively. The movement of the dial

Needle feeding and discharging mechanism.

Referring to Figs. 1 and 2, the needle feeding mechanism for delivering the unstraightened needles from the hopper to the peripheral V shaped seats in the needle supporting dial may be of any desired construction, and the conventional illustration herein set forth includes a hopper 291 from which the needles are successively delivered to the needle retaining seats by the action of the pins 14 operating within the notches 292 of an operating wheel 293.

The construction of the feeding hopper and associated mechanism is more fully described in detail in my copending application hereinbefore referred to.

The straightened needle discharging mechanism is also conventionally illustrated herein and comprises a retaining band 294 yieldingly held against the shanks of the straightened needle as the dial is revolved. A spring 295 serves to hold the band 294 in position with relation to the dial and a discharge chute 296 through which the straightened needles pass with the needle receiving pan 297 reciprocally mounted upon the bed of the machine. The needle pan 297 is mounted upon a carriage 298 reciprocally controlled by a double threaded worm 299 driven by a pulley 300 over which passes a belt 301. The belt 301 also passes around a pulley 302 keyed to shaft 4. When the shaft 4 is rotated during the straightening operation as hereinbefore described the double worm 299 is operated and the needle pan is moved so as to evenly distribute the discharged straightened needles when the dial is again rotated.

Main driving shaft.

Referring to Figs. 1 and 2, the main driving shaft 310 is supported in bearings 311 formed on depending hangers 312 bolted to the bed of the machine. Mounted upon the main shaft is a series of pulleys 313, 314 and 315 over which pass the belts 44, 46 and 178 respectively, hereinbefore described in connection with the dial reversing mechanism and the blow wheel operating means. A driving pulley 316 is also carried by the main shaft 310 and is associated with a clutch 317 controlled by the operating lever 318. A driving belt 319 passes over the pulley 316 and beneath two pulleys 320 arranged side by side at the rear of the machine as shown in Fig. 2. From beneath these pulleys 320 the driving belt is carried to a suitable source of power not shown. A crank handle 321 is provided on one end of the main driving shaft 310 and permits of the machine being turned over by hand when adjusting or timing the several mechanisms.

While I have shown this form of driving mechanism for the needle machine, it will be understood that various other arrangements may be employed.

Needle dial markings.

For readily observing the action of the straightening devices and the relative straightening of the needles, the three groups of ten needles each are indicated on the face of the dial by the letters A, B and C.

Each needle retaining seat in the periphery of the dial in each group is numbered from 1 to 10 as shown. If for any reason one or more of the straightening devices and associated mechanisms should fail to properly operate upon the needle to straighten the same, this fact can be easily determined by examining the needle and tracing it back to the numbered needle retaining seat in the lettered group from which it was discharged, and the particular hammer and other devices which operated upon the needle can be properly adjusted.

Operation of machine.

The needles after being tempered in the usual manner are deposited in the needle hopper 291. From the hopper the needles are successively fed to the V-shaped slots 9 formed in the periphery of the needle supporting dial 3. The feeding of the needles from the hopper takes place when the dial 3 is moving in a counter-clockwise direction.

The needle dial 3 is moved in this direction by the action of the gear 18, to the hub 19 of which are secured the roller sections 20 with which the pawls 25 carried by the dial, engage. As shown in Figs. 10 and 12, the pawls 25 are in engagement for rotating the dial 3, while the needles are fed from the hopper. When the dial is rotated, it will be seen that the pins 14 carried thereby, successively engage the notches 292 in the wheel 293 thereby actuating the feeding mechanism (not shown). There are ten pins 14 shown, corresponding in number to the number of needles retaining seats for delivery, a needle to each seat.

When the gear 18 is rotating to revolve the needle supporting dial, while the needles are being fed into the V-shaped seats, the clutch member 40 is in engagement with the movable clutch member 42, (see Fig. 8). The locking lever 70 is disengaged during the rotary movement of the dial, the beveled surface 97 upon the lever 95 secured to the lever 61 having forced the beveled surface 98 upon the lug 99 located on the slide 84, outwardly into the position shown in Fig. 8.

When the last or tenth needle has been delivered to the V-shaped seat, the reversing mechanism for disengaging the clutch 40 and engaging the clutch 41 with the movable clutch member 42, operates by reason of the reversing latch 66 striking against the upper end 64 of the lever 61, moving the said lever on its pivot 62. The clutch lever 47 and its interconnected parts hereinafter referred to are thereby operated for engaging the said clutch 41. As the points of the mating surfaces 51 and 58 clear each other during this operation, it will be apparent that after the lower end of the lever 61 is moved, the lug 99 of the slide 84 becomes disengaged from the end of the lever 95 and can be further released for locking the dial. Referring now to Fig. 25, just before the dial 3 stops rotating, one of the pins 86 carried by the dial strikes the arm 85 of the pawl 73 and lifts the arm 82 thereof out of the notch 83 which is provided in the slide 84, thereby allowing the spring 80 to force the locking lever 70 and its nose 76 against the dial, and more especially the inclined surface 78, along which it rides until the notch 77 in the dial is reached. At this time the reversing mechanism operates, the clutch 40 becomes disengaged, and the clutch 41 becomes engaged (see Fig 25). The dial is now locked against rotary movement and is ready to be reciprocated. As soon as the clutch 41 is engaged, the gear 18 starts to move in an opposite direction (see arrow in Fig. 12).

Referring to the Figs. 7 and 10 to 14, inclusive, the roller sections 20 carried by the reversing gear 18 begin operating first for a short distance upon the face of the dial 3, and then successively upon the cam courses 32, 34, 35 and 36. As the roller 29 of each section 20 rides upon the relatively steep course 32 of each cam 17, the dial 3 is forced inwardly, thereby presenting the needles to be straightened beneath the hammers 105 and above the selective fingers 225 and the block members 252 (see Fig. 29). Subsequent to the slight dwell of the roller 29 upon the high points 33 of the cams, the said rollers ride upon the cam course 34 as the needle dial moves outwardly.

During the outward movement of the dial, the separate devices including the hammers and needle crook detecting devices are operated. Referring now to Figs. 3, 4, 7 and 15 to 20, inclusive, the blow wheel 110 is now operated for striking the blow levers 108, which in turn strike against the hammer levers 107 for causing the hammers 105 to vibrate. The relative timing of the operation of the blow wheel is dependent upon the actuation of the interconnected levers and tripping latches 200 and 210, as heretofore described. During the time that the hammers 105 are operating, the clutch 165 is in engagement with the movable clutch member 176, as shown in Figs. 15 and 18. In the position shown in Fig. 18, the clutch member 176 has just been let in by the striking of the tripping latch 210 against the nose 194 of the lever 191, and it is this operation which takes place at or about the time the rollers 29 reach the dwells 33 on the cams 17 prior to the movement of the dial outwardly. As the rollers 29 ride along the cam course 35, the needles are straightened by the action of the needle crook detecting mechanism, including the selective fingers which follow the curves and crooks in the blade of the needle and the relative striking or vibrating of the hammers against the needles upon the middle of the block members 252.

The relative setting of the selective blow devices 246 and their striking members 248 carried by the hammer lever 107 depends upon the degree of the curve or crook discovered by the selective fingers and light or heavy blows are made possible according to the selection made by each blow device 246.

When the clutch 176 is drawn into engagement, it will be noted that the nose 184 of the lever 182 is set for engagement with the tripping latch 200 carried by the hub 21 of the reversing gear 18. As the rollers 29 continue to move along the cam courses 35 and 36, after which the dial is moved all the way out by the action of the spring 23, interposed between the dial 3 and the standard 7, the reversing action of the gear 18 again takes place, and at or just before the operation, it will be noted that the tripping latch 200 strikes the nose 184 of the lever 182 and lifts the pawl 183 out of the notch 185 in the bar 171 (see Fig. 15) thereby setting the upper inclined nose 167 of the master clutch lever 168 in the path of the pins 166 carried by the worm gear 160, which continues to revolve as long as the clutch members 176 and 165 are engaged. Referring to Fig. 16, it will be seen that the slightest movement of the worm gear 160 and any one of the pins 166 against the inclined surface 167 of the lever 168 will disengage the clutch member 176 from the member 165 and the worm gear 160 will be stopped. This worm gear being keyed to the shaft 4 causes the blow wheel 110 to cease revolving and in turn the hammers are stopped. During this operation, it will be noted that the nose 194 of the lever 191 is set for engagement by the tripping latch 210 upon the next operation. As heretofore described, the operation of the reversing lever 61 at this time causes the beveled surface 97 provided upon the lever 95 to ride against the beveled surface 98 upon the lug 99 formed on the slide 84, and in accordance with the description given of the locking mechanism, and referring to Figs. 24 to 28 inclusive, the said slide 84, into the notch 83 of which the pawl 85 has dropped, will be withdrawn, thereby moving the nose 76 of the locking lever 70 out of the notch 77 in the dial, for another intermittent rotary movement, during which movement the straightened needles are delivered through the discharging means into the receiving needle pan, and a new set of needles to be straightened is fed from the dial to the V-shaped seats 9 on the periphery of the dial.

While the needles are being straightened, it will be noted that the band wheel 260 is moved over the shanks of the needles through the operation of the shaft 4 and the bevel gearing shown in Figs. 1 and 26. It will also be noted that the said band reciprocates inwardly and outwardly with the dial as hereinbefore described. As the dial rotates, the discharge of the straightened needles is effected. The needles are deflected through the chute 296 into the needle receiving pan 297, which is relatively intermittently movable at the time of the rotation of the shaft 4.

From the foregoing description, it will be obvious that an automatic machine has been produced, which is capable of successively grouping a plurality of needles, simultaneously straightening the said needles by mechanism including a positive blow selecting means, which determines the character of the blow to be given each needle; and designed to readily discharge the straightened needles during the delivery of another set of needles to be straightened.

Various changes in the invention may be resorted to without departing from the spirit thereof, and I do not limit myself to the exact details or relative proportions herein set forth.

Having thus described my invention, what I claim as new and desire to secure by Letters Patent, is:—

1. In a needle straightening machine, the combination of a needle support, a plurality of simultaneously operated hammers, a hammer lever, and a needle crook detecting device for each of said hammers including a slidably mounted blow member independently movable with relation to the hammers, and a pivoted lever having one end designed to contact with the blade of the needle and the other end adapted to shift the blow member toward and away from the hammer lever for limiting the movement thereof.

2. In a needle straightening machine the combination with a needle support of a plurality of straightening hammers, a lever for each of said hammers, and a needle crook detecting device for each hammer comprising a slidably mounted blow member, pivoted links connected to said blow member, and a pivoted lever having one end designed to contact with the blade of the needle and the other end adapted to operate the pivoted links for shifting the said blow member toward and away from the hammer lever to limit the movement thereof.

3. In a needle straightening machine the combination with a needle support, of a plurality of straightening hammers, a lever for each of said hammers, and a needle crook detecting device for each hammer comprising a slidably mounted blow member, parallel links connected to said blow member, a bar connecting said links, and a pivoted lever having one end connected to the aforesaid bar for shifting the blow member toward and away from the hammer lever for limiting the movement thereof.

4. In a needle straightening machine, the combination with a needle support, of a straightening hammer, a lever for said hammer, a blow wheel, a needle crook detecting device associated with said hammer comprising a slidably mounted blow member, a lever having one end designed to contact with the blade of the needle, and the other end adapted to shift the said blow member toward and away from the hammer lever for limiting the movement thereof, and means including a rod interposed between the hammer lever and the blow wheel for operating said hammer lever.

5. In a needle straightening machine, the combination with a needle support, of a straightening hammer, a lever for said hammer, a blow wheel, a needle crook detecting device associated with said hammer comprising a slidably mounted blow member, a lever having one end designed to contact with the blade of the needle and the other end adapted to shift the said blow member toward and away from the hammer lever for limiting the movement thereof, and means including a lever and a rod interposed between said last-mentioned lever and the hammer lever for operating said hammer lever.

6. In a needle straightening machine, the combination with a needle support, of a straightening hammer, a lever for said hammer, a blow wheel, a needle crook detecting device associated with said hammer comprising a slidably mounted blow member, a lever having one end designed to contact with the blade of the needle and the other end adapted to shift the said blow member toward and away from the hammer lever for limiting the movement thereof, means including a lever and a rod interposed between said last-mentioned lever and the hammer lever for operating said hammer lever, and a spring connected to the aforesaid lever and the hammer lever.

7. In a needle straightening machine, the combination with a needle support, of a straightening hammer, a lever for said hammer, a blow wheel, a needle crook detecting device associated with said hammer comprising a slidably mounted blow member, a lever having one end designed to contact with the blade of the needle, and the other end adapted to shift the said blow member toward and away from the hammer lever for limiting the movement thereof, means including a vertically disposed rod interposed between the hammer lever and the blow wheel for operating said hammer lever, and means including a blow wheel for actuating the aforesaid rod.

8. In a needle straightening machine, the combination with a needle support, of a straightening hammer, a lever for said hammer, a needle crook detecting device associated with said hammer comprising a slidably mounted blow member, a lever having one end designed to contact with the blade of the needle and the other end adapted to shift the said blow member toward and away from the hammer lever for limiting the movement thereof, means including a lever and a rod interposed between said last-mentioned lever and the hammer lever for operating said hammer lever, a spring connected to the aforesaid lever and the hammer lever, and means including a blow wheel for actuating the said last mentioned lever.

9. In a needle straightening machine, the combination with a needle support, of a straightening hammer, a lever for said hammer, a blow wheel, a needle crook detecting device associated with said hammer and comprising a slidably mounted blow member, a lever having one end designed to contact with the blade of the needle, and connections between the opposite end of said lever and the slidable blow member including a pivoted frame engaging said opposite end of the lever and connected to the blow member for movement of the latter.

10. In a needle straightening machine, the combination of a needle support, a straightening hammer, a needle for said hammer, a blow wheel, a needle crook detecting device associated with said hammer comprising a slidably mounted blow member, a lever having one end designed to contact with the blade of the needle, and a connection between the opposite end of the lever and the slidable blow member for shifting said blow member toward and away from the hammer lever for limiting the movement thereof, said connection including a frame composed of parallel links pivotally connected at one end to the blow member and connected also to said opposite end of the pivoted lever.

11. In a needle straightening machine the combination with a needle support, of a plurality of straightening hammers a series of block members upon which the needles are straightened, and a needle crook detecting device associated with each hammer and block member and including a slidably mounted blow member for determining the strength of the blow delivered by the needle, said blow member having pivotal movement in a plane transverse of that in which the hammer moves.

12. In a needle straightening machine, the combination with a needle support, of a straightening hammer, a blow wheel with operative connections between said blow wheel and the hammer for tripping the same, and a spring for operating the hammer to give the blow thereto, a needle crook detecting device having one end bearing upon the needle to be straightened, a blow member slidably mounted on the machine frame and carrying a pivoted frame in operative contact with the opposite end of the sensitive finger.

13. In a machine of the character described, a pivoted straightening hammer with means for operating it in one direction, and a spring for returning it, means for controlling the effective blow of the hammer comprising a slidably mounted blow member, and a frame composed of links pivoted to said blow member and in operative connection with one end of said sensitive finger whereby in the movement of said sensitive finger the pivoted frame work is moved up and down and the blow member slides to cause it to engage the pivoted hammer at varying points to vary the movement of said hammer.

14. In a needle straightening machine the combination with a needle support having a plurality of needle retaining seats, of a plurality of straightening hammers, a needle crook detecting device for each hammer including a slidably mounted blow controlling member, means including an endless belt for revolving the needles in said seats during the straightening operation, and means including changeable intermeshing gears whereby the speed of rotation of said needles may be varied.

15. In a needle straightening machine the combination with a needle support having a plurality of needle retaining seats, of a series of straightening hammers, needle crook detecting devices including slidably mounted blow controlling members, means for revolving the needles in the said seats, and means whereby varying speeds can be given the needle revolving means.

In testimony whereof, I affix my signature, in the presence of two witnesses.

ALEXANDER ALTMAN.

Witnesses:
D. HILDRETH,
M. A. O'MEARA.